United States Patent
Yoo et al.

(10) Patent No.: US 11,445,216 B2
(45) Date of Patent: Sep. 13, 2022

(54) IMAGE PREDICTION METHOD AND APPARATUS FOR PERFORMING INTRA PREDICTION

(71) Applicant: LG ELECTRONICS INC., Seoul (KR)

(72) Inventors: Sunmi Yoo, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/276,026

(22) PCT Filed: Sep. 16, 2019

(86) PCT No.: PCT/KR2019/011913
§ 371 (c)(1),
(2) Date: Mar. 12, 2021

(87) PCT Pub. No.: WO2020/055208
PCT Pub. Date: Mar. 19, 2020

(65) Prior Publication Data
US 2022/0053213 A1 Feb. 17, 2022

Related U.S. Application Data

(60) Provisional application No. 62/731,143, filed on Sep. 14, 2018.

(51) Int. Cl.
*H04N 19/593* (2014.01)
*H04N 19/11* (2014.01)
(Continued)

(52) U.S. Cl.
CPC .......... *H04N 19/593* (2014.11); *H04N 19/11* (2014.11); *H04N 19/117* (2014.11);
(Continued)

(58) Field of Classification Search
CPC ...... H04N 19/159; H04N 19/11; H04N 19/80; H04N 19/46; H04N 19/59; H04N 19/70;
(Continued)

(56) References Cited

U.S. PATENT DOCUMENTS

2012/0140821 A1* 6/2012 Drugeon ............... H04N 19/11
375/240.12
2013/0003832 A1* 1/2013 Li ....................... H04N 19/182
375/240.12
(Continued)

FOREIGN PATENT DOCUMENTS

KR 20180098160 A 9/2018
WO 2015127581 A1 3/2015

OTHER PUBLICATIONS

Alexey Filippov, et al., "CE3-related: Interpolation filtering for intra-prediction within rectangular blocks", Joint Video Experts Team (JVET) of ITU-T SG 16 WP 3 and ISO/IEC JTC 1/SC 29/WG 11, 11th Meeting: Ljubljana, SI, Jul. 10-18, 2018. JVET-K0518-v1.

*Primary Examiner* — Neil R Mikeska
(74) *Attorney, Agent, or Firm* — Dentons US LLP

(57) ABSTRACT

An image decoding method according to the present document may comprise the steps of: deriving an intra prediction mode for a current block; deriving reference samples located around the current block; generating a prediction sample for the current block on the basis of the intra prediction mode and the reference samples; and generating residual samples for the current block on the basis of the prediction sample, wherein the step of generating the prediction sample for the current block may comprise the steps of: deriving an interpolation filter, which is to be applied to the reference sample, on the basis of the prediction mode of the current block or the size of the current block; and generating the prediction sample by applying the derived interpolation filter to the reference sample.

9 Claims, 20 Drawing Sheets

(51) Int. Cl.
*H04N 19/117* (2014.01)
*H04N 19/132* (2014.01)
*H04N 19/136* (2014.01)
*H04N 19/176* (2014.01)

(52) U.S. Cl.
CPC ......... *H04N 19/132* (2014.11); *H04N 19/136* (2014.11); *H04N 19/176* (2014.11)

(58) Field of Classification Search
CPC .. H04N 19/105; H04N 19/157; H04N 19/593; H04N 19/635; H04N 19/176; H04N 19/174; H04N 19/182; H04N 19/96
See application file for complete search history.

(56) References Cited

U.S. PATENT DOCUMENTS

| | | | |
|---|---|---|---|
| 2016/0373743 A1 | 12/2016 | Zhao et al. | |
| 2017/0150180 A1 | 5/2017 | Lin et al. | |
| 2018/0091825 A1* | 3/2018 | Zhao | H04N 19/159 |
| 2018/0160113 A1* | 6/2018 | Jeong | H04N 19/593 |
| 2019/0028703 A1* | 1/2019 | Tamse | H04N 19/176 |
| 2019/0379891 A1* | 12/2019 | Moon | H04N 19/176 |
| 2020/0204799 A1* | 6/2020 | Lee | H04N 19/11 |
| 2020/0228836 A1* | 7/2020 | Schwarz | G06T 15/04 |

* cited by examiner

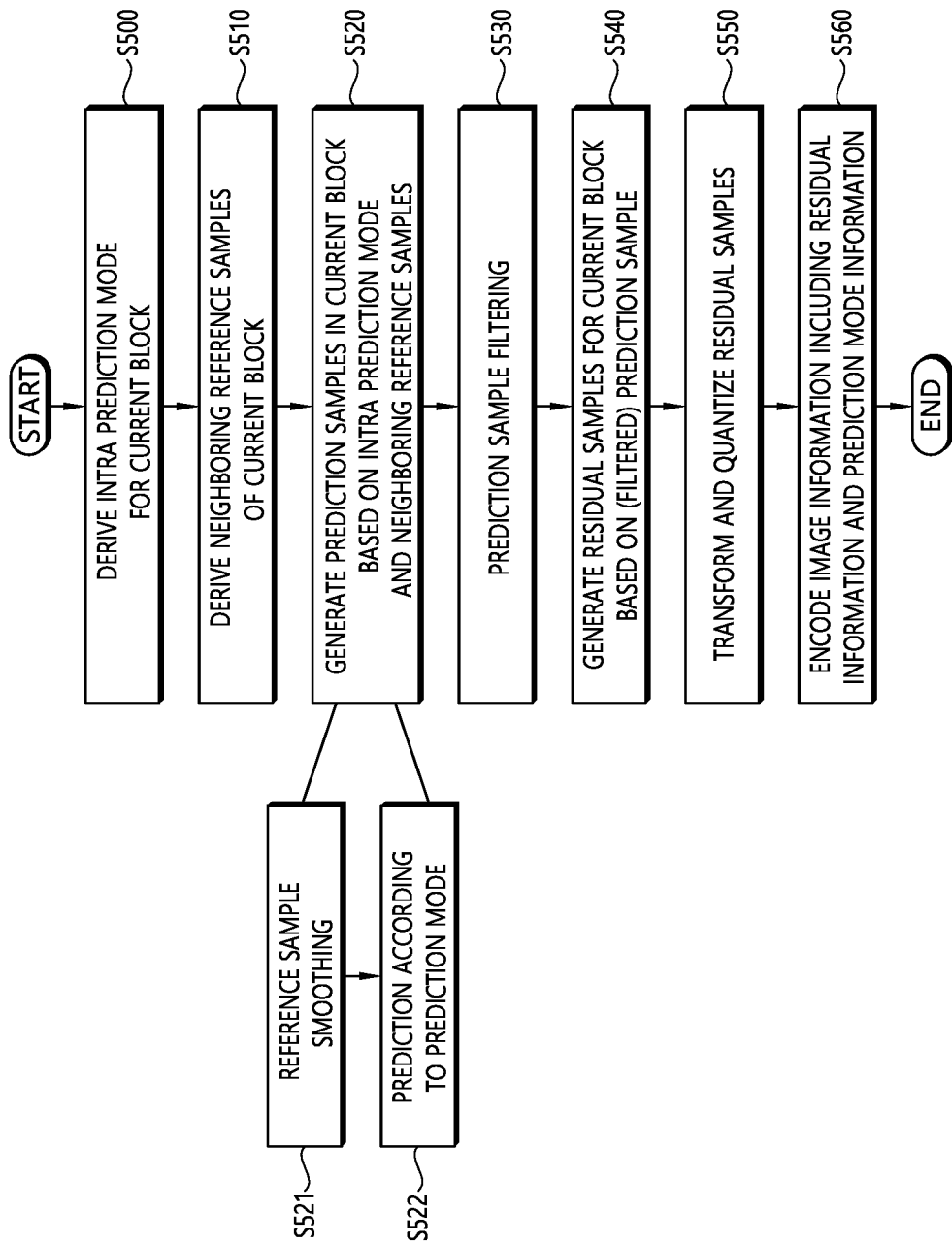

FIG. 17
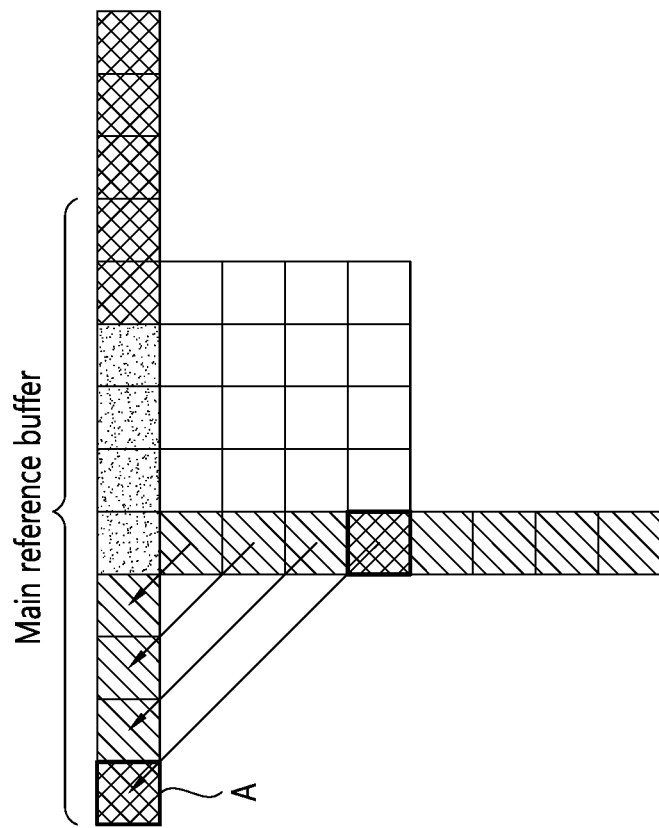
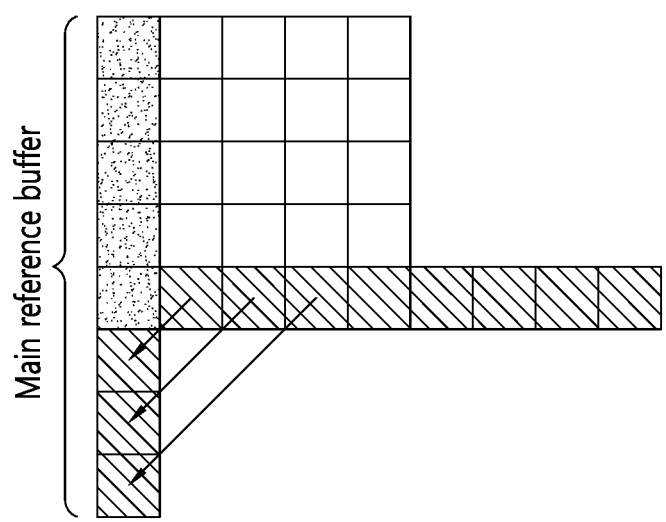

IMAGE PREDICTION METHOD AND APPARATUS FOR PERFORMING INTRA PREDICTION

CROSS-REFERENCE TO RELATED APPLICATIONS

This application is the National Stage filing under 35 U.S.C. 371 of International Application No. PCT/KR2019/011913, filed on Sep. 16, 2019, which claims the benefit of U.S. Provisional Application No. 62/731,143 filed on Sep. 14, 2018, the contents of which are all hereby incorporated by reference herein in their entirety.

BACKGROUND OF THE DISCLOSURE

Field of the Disclosure

The present document relates generally to an image coding technology and, more particularly, to an image coding method based on intra prediction and an apparatus therefor.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

A technical objective of the present document is to provide a method and apparatus which increase image coding efficiency.

Another technical objective of this document is to provide an intra prediction method and apparatus for interpolating reference samples under the consideration of the size and prediction mode of a current block.

Still another technical objective of this document is to provide an intra prediction method and apparatus which are capable of effectively deriving reference samples under the consideration of the distance between a prediction sample and a reference sample.

Still another technical objective of this document is to provide an image coding method and apparatus which are capable of increasing the precision of intra prediction.

According to an embodiment of the present document, there is provided an image decoding method performed by a decoding apparatus, the method including: deriving an intra prediction mode for a current block; deriving reference samples adjacent to the current block; generating a prediction sample for the current block based on the intra prediction mode and the reference samples; generating a reconstructed picture for the current block based on the prediction sample, wherein the generating of the prediction sample for the current block includes deriving an interpolation filter to be applied to the reference sample based on a prediction mode of the current block or the size of the current block; and generating the prediction sample by applying the derived interpolation filter to the reference sample.

According to another embodiment of the present document, there is provided an image encoding method by an encoding apparatus, the method including: deriving an intra prediction mode for a current block; deriving reference samples adjacent to the current block; generating a prediction sample for the current block based on the intra prediction mode and the reference samples; generating residual samples for the current block based on the prediction sample; and encoding image information including information on the intra prediction mode and the residual sample, wherein the generating of the prediction sample for the current block includes deriving an interpolation filter to be applied to the reference sample based on a prediction mode of the current block or the size of the current block; and generating the prediction sample by applying the derived interpolation filter to the reference sample.

According to still another embodiment of the present document, there is provided an image encoding apparatus, the apparatus including a predictor which derives an intra prediction mode for a current block based on information on a prediction mode of the current block, derives reference samples adjacent to the current block, generates a prediction sample for the current block based on the intra prediction mode and the reference samples, and generates a reconstructed picture for the current block based on the prediction sample, wherein the predictor derives an interpolation filter to be applied to the reference sample based on a prediction mode of the current block or the size of the current block in order to generate the prediction sample for the current block, and generates the prediction sample by applying the derived interpolation filter to the reference sample.

According to still another embodiment of the present document, a digital storage medium in which image data including encoded image information generated according to the image encoding method performed by an encoding apparatus is stored may be provided.

According to still another embodiment of the present document, a digital storage medium in which image data including encoded image information causing the decoding apparatus to perform the image decoding method is stored may be provided.

According to an embodiment of the present document, it is possible to increase general image/video compression efficiency.

According to an embodiment of the present document, it is possible to effectively derive an interpolation filter that interpolates a reference sample under the consideration of the size and prediction mode of the current block.

According to an embodiment of the present document, it is possible to effectively derive a reference sample under the consideration of a distance between a prediction sample and a reference sample.

According to an embodiment of the present document, an image coding method and apparatus which are capable of increasing the precision of intra prediction can be provided.

BRIEF DESCRIPTION OF THE DRAWINGS

FIG. 5 is a control flowchart illustrating an encoding method that may be applied in the intra prediction according to an embodiment of the present document.

FIGS. 17 and 18 are diagrams illustrating how to perform padding depending on a negative angle and a positive angle when constructing a main reference sample buffer according to another example of the present document.

DESCRIPTION OF EMBODIMENTS

Figure 1:
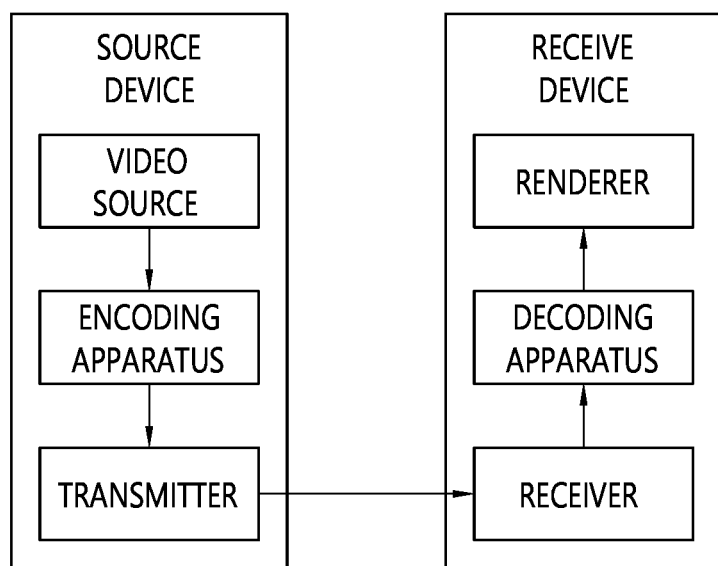
FIG. 1 schematically represents an example of a video/image coding system to which the present document may be applied.

An exemplary embodiment of the present disclosure provides an image information decoding method performed by a decoding apparatus. The method includes: decoding a non-separable secondary transform (NSST) index from a bitstream, if an NSST is applied to a target block, decoding information about transform coefficients for the target block from the bitstream, based on the decoded NSST index, and deriving the transform coefficients for the target block based on the decoded information about the transform coefficients, in which the NSST index is decoded prior to the information about the transform coefficients for the target block.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, a method/embodiment disclosed in this document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In this document, a tile group and a slice may be used in place of each other. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the symbol "/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C." (In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.")

Additionally, in the present document, the term "or" should be interpreted as "and/or." For example, the expression "A or B" may mean 1) only "A", 2) only "B", and/or 3) "both A and B." In other words, the term "or" in the present document may mean "additionally or alternatively." (Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively.")

Figure 2:
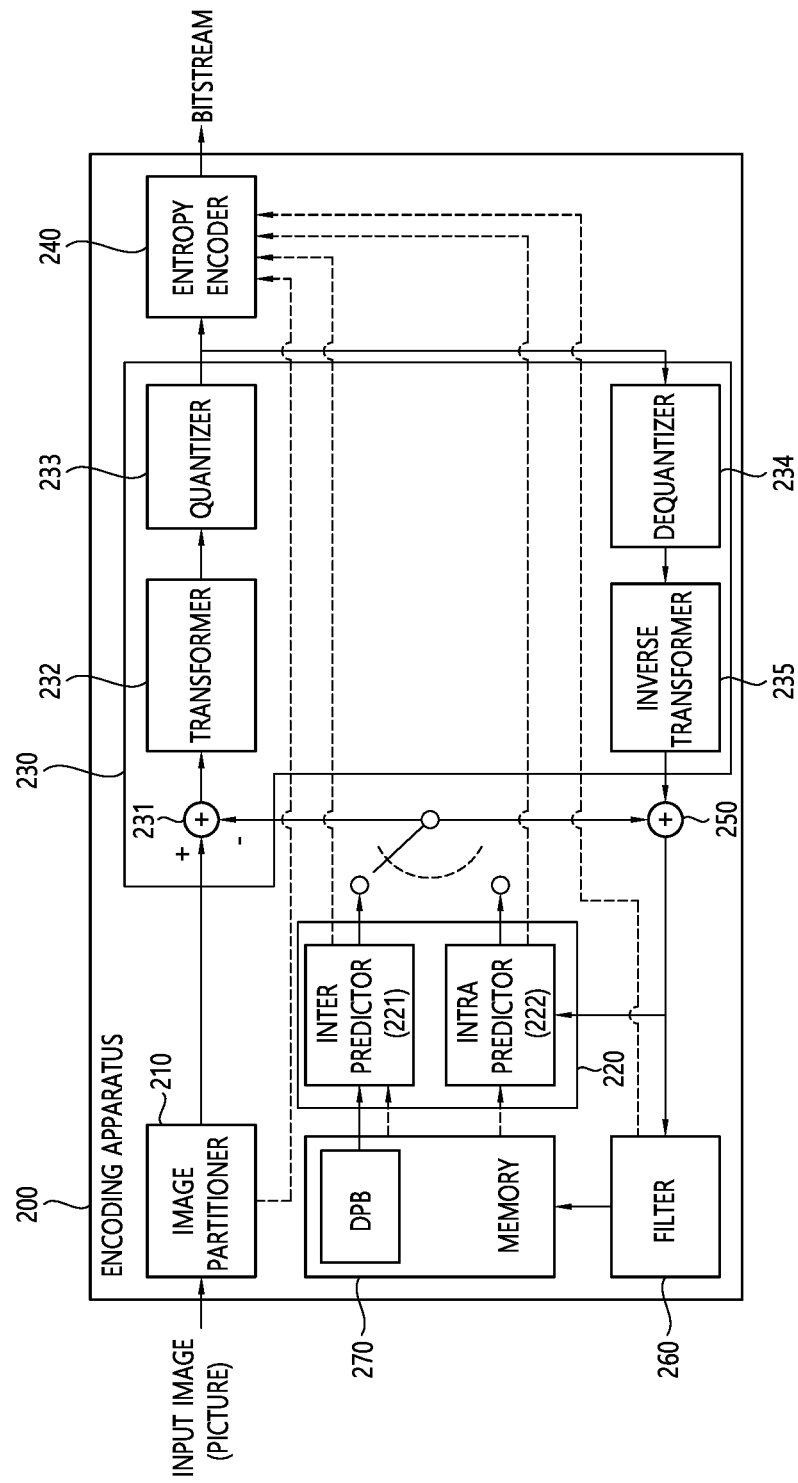
FIG. 2 is a diagram schematically illustrating a configuration of a video/image encoding apparatus to which the present document may be applied.

FIG. 2 is a diagram schematically illustrating a configuration of a video/image encoding apparatus to which the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
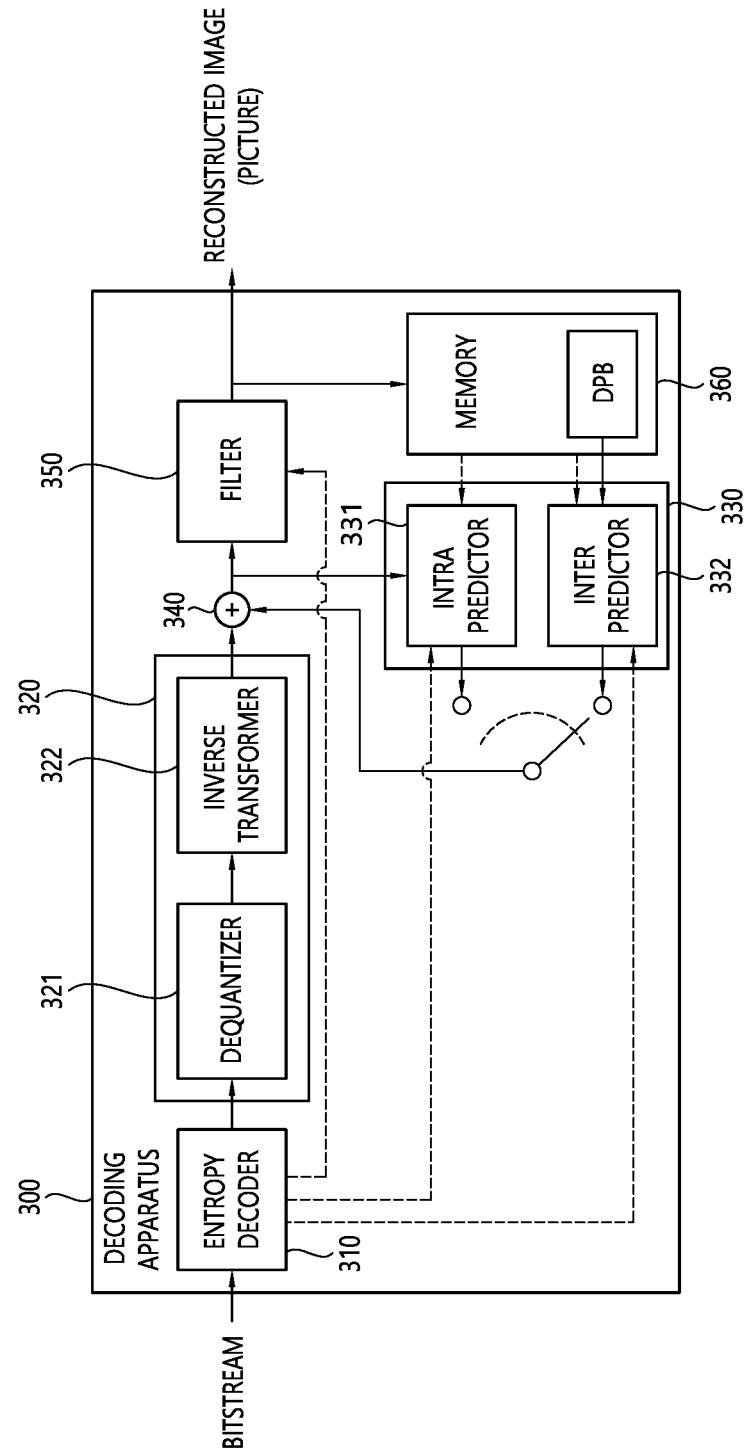
FIG. 3 is a diagram schematically illustrating a configuration of a video/image decoding apparatus to which the present document may be applied.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4A:
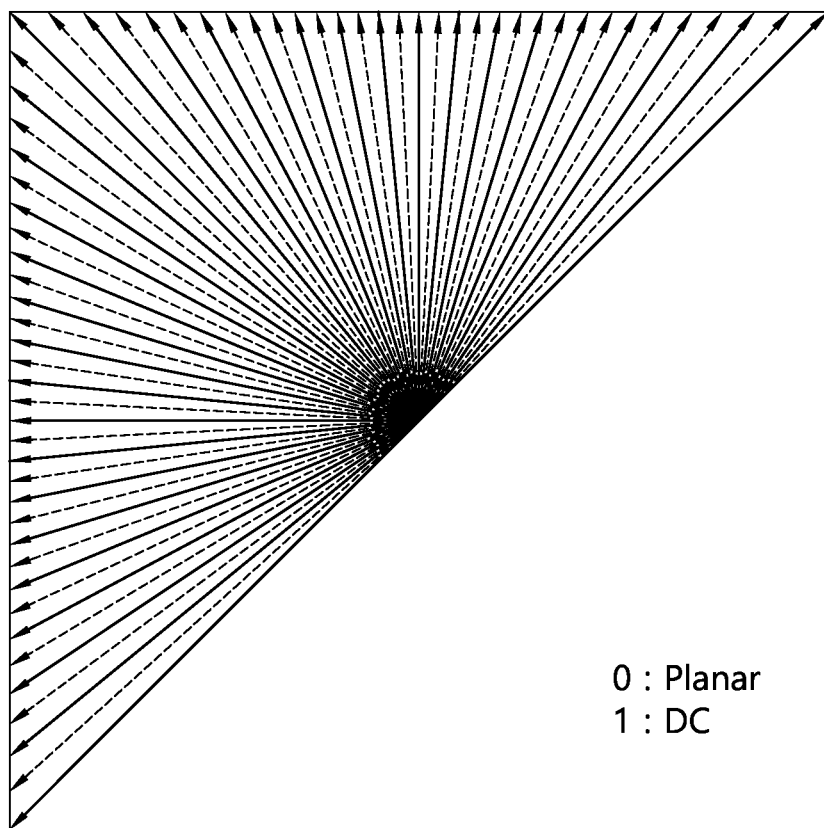
FIG. 4A is a diagram representing 67 intra prediction modes according to an embodiment of the present document.
Figure 4B:
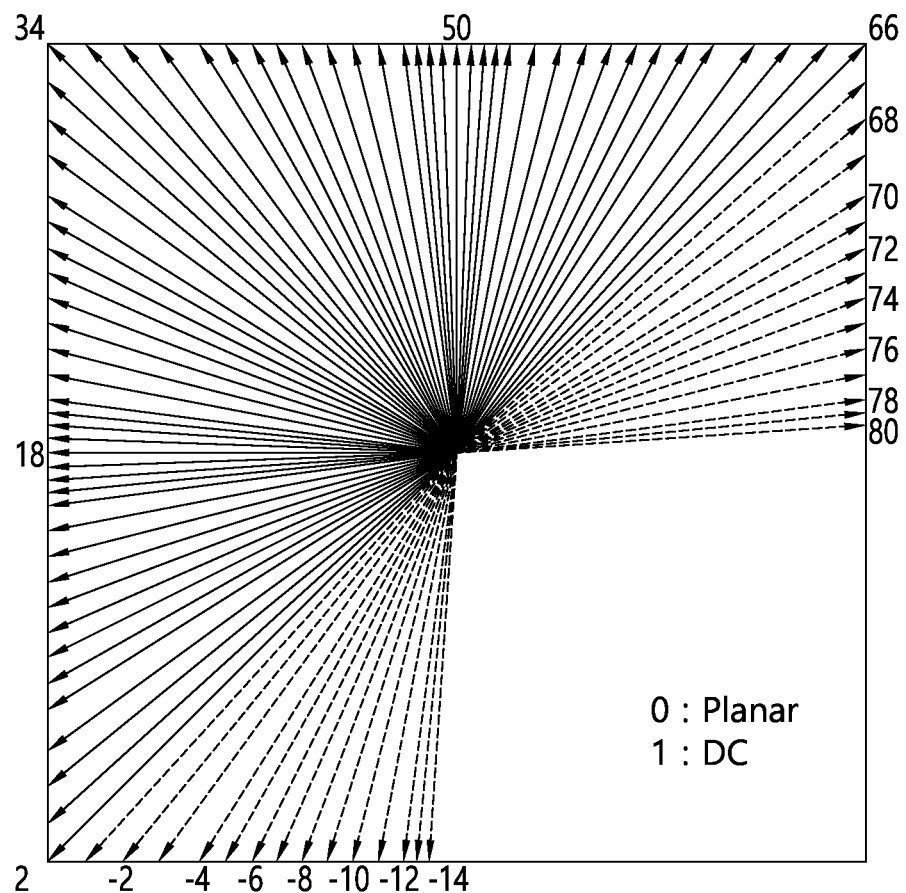
FIG. 4B is a diagram further showing wide-angle intra prediction modes according to an embodiment of the present document.

FIG. 4A is a diagram representing 67 intra prediction modes according to an embodiment of the present document, and FIG. 4B is a diagram further showing wide-angle intra prediction modes according to an embodiment of the present document.

In intra prediction according to an embodiment of the present document, 67 intra prediction modes as shown in FIG. 4A and Table 1 may be used.

TABLE 1

| 인트라 예측 모드<br>(Intra prediction mode)<}45{>Intra prediction mode | 관련 명칭(Associated name)<}0{>Associated name |
|---|---|
| 0 | intra planar (인트라 플래너 (INTRA_PLANAR)<}30{>INTRA_PLANAR} |
| 1<}100{>1 | intra DC (인트라DC (INTRA_DC)<}42{>INTRA_DC} |
| 2 ... 66 | 인트라 방향성 2... 인트라 방향성 66 (INTRA_ANGULAR2 ... INTRA_ANGULAR66)<}100{>Intra angular 2 ... intra angular 66 (INTRA_ANGULAR 2 ... INTRA_ANGULAR 66) |

This is an extension of the existing 35 angular modes to 67 angular modes for intra-encoding and more accurate prediction of high-resolution image. Arrows represented by dotted lines in FIG. 4A indicate 32 newly added angular modes in the 35 angular modes. The intra planner (INTRA_PLANAR) mode and the intra DC (INTRA_DC) mode are the same as the existing intra planner mode and the existing intra DC mode. The added 32 angular modes may be applied to all block sizes, and may be applied to both intra encoding and decoding of the luminance (luma) component and the chrominance (chroma) component.

Referring to FIG. 4A, intra prediction mode 2 may represent a left downward diagonal direction, 34 may represent a left upward diagonal direction, and 66 may represent a right upward diagonal direction. In FIG. 4, a vertical direction may be indicated with an intra prediction mode 50 and a horizontal direction may be indicated with an intra prediction mode 18.

Figure 8:
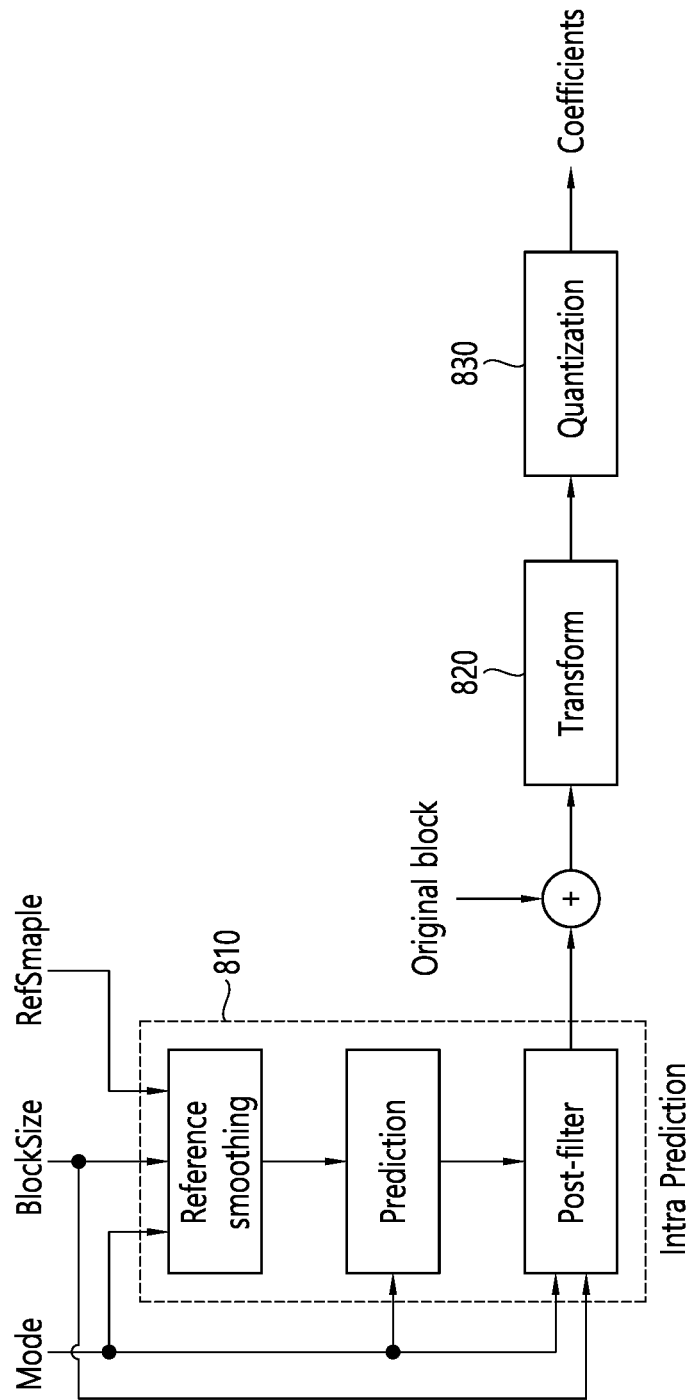
FIG. 8 schematically represents an encoding apparatus performing an image encoding method according to FIG. 5.

FIG. 5 is a control flowchart illustrating an encoding method that may be applied in the intra prediction according to an embodiment of the present document, and FIG. 8 is a control block diagram illustrating a configuration of an encoding apparatus that performs the intra prediction of FIG. 5.

According to FIG. 5, the encoding apparatus may derive an intra prediction mode for a current block (S500), and derive neighboring reference samples of the current block (S510).

When restoring a block to which the intra prediction has been applied, the encoding apparatus constructs a prediction block using neighboring pixels of the block. In order to generate a prediction sample of the current block according to the prediction mode, neighboring pixels, that is, reference samples, must be derived.

Assuming that the size of the current block is N, the maximum size of the reference pixel to which reference may be made when performing the intra prediction may be 2N pixels adjacent to the top, 2N pixels adjacent to the left side, and a corner pixel in the top-left corner.

Figure 6:
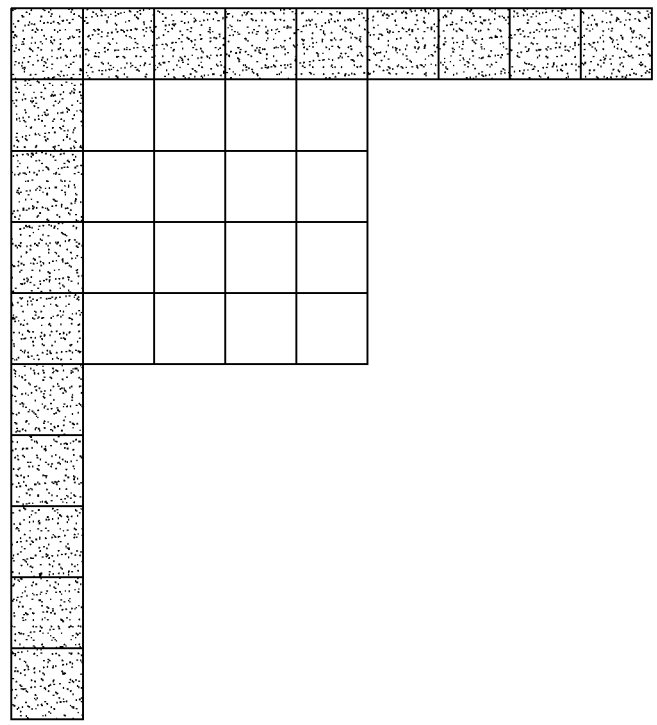
FIG. 6 is a diagram showing an example of a reference pixel that may be used for intra prediction.

FIG. 6 is a diagram showing an example of a reference pixel that may be used for intra prediction.

As illustrated, when the intra prediction is performed on a 4×4 block, neighboring samples to which reference may be made are 2N(8) samples adjacent to the top of the 4×4 block, 2N(8) samples adjacent to the left side, and a corner sample in the top-left corner.

Reference samples to which reference is made for prediction may be subjected to smoothing processing depending on the size and sample value of the current block. This is to prevent in advance a visual artifact of a prediction block to be derived due to a difference between reference samples.

The encoding apparatus generates prediction samples within the current block based on the intra prediction mode and the neighboring reference samples (S520).

The method used when predicting an intra block by using reference samples adjacent to the current block may be generally classified into two kinds of methods, that is, an angular prediction method in which a prediction block is constructed by copying reference samples located along a specific direction, and a non-angular prediction method (DC mode, planner mode) in which as many reference pixels as can be referenced are utilized.

The angular prediction method was devised to express the structure of various directions that may appear on the screen. The angular prediction method may be performed by designating a specific direction as a mode as shown in FIG. 4, and then copying reference samples corresponding to the prediction mode angle into the sample to be predicted.

Figure 7:
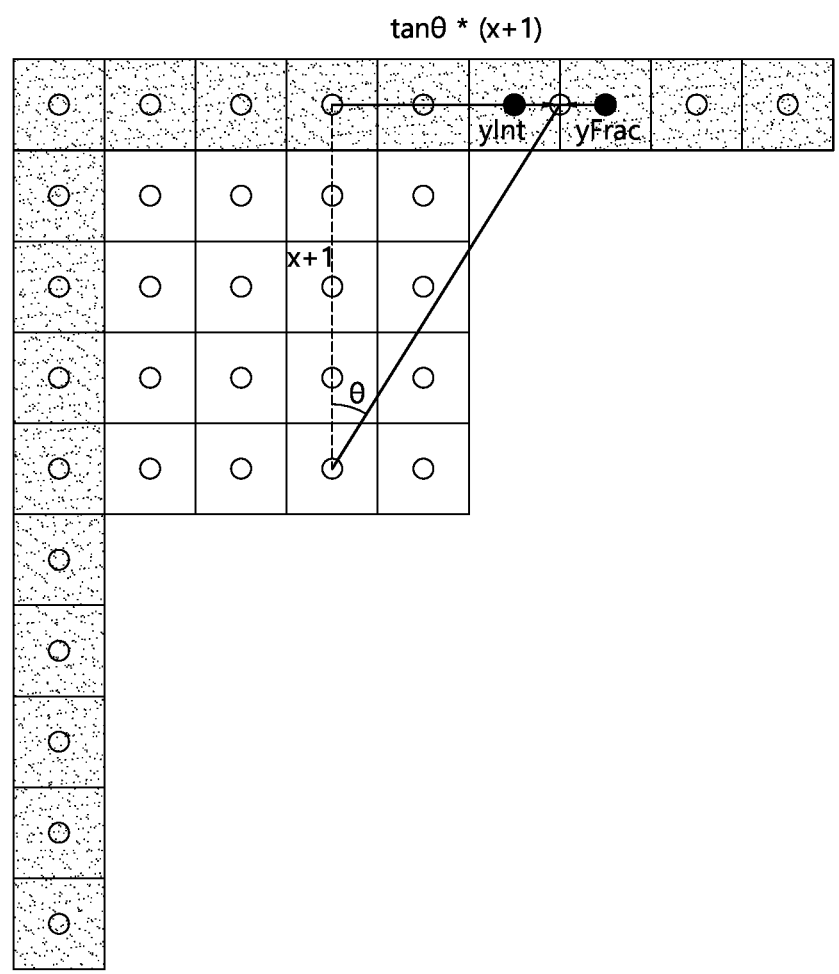
FIG. 7 is a diagram illustrating reference pixel interpolation with respect to a location of a fractional pixel.

If it is not possible to make reference to a reference pixel of an integer pixel unit, as shown in FIG. 7, the prediction block may be constructed by copying a pixel which has been interpolated using a distance ratio between two corresponding pixels and two pixels obtained by an angle.

FIG. 7 is a diagram illustrating reference pixel interpolation with respect to a location of a fractional pixel (sub pel).

As shown, when the position of the reference sample where the prediction direction is applied to the prediction sample P is a fractional pixel (yFrac) rather than an integer sample (yInt), a tan value for the prediction angle (θ) is required in order to obtain the position of the reference sample.

In order to calculate the position of a sub pel, that is, a fractional pixel, Table 2 shows the tan value for the angle θ of each mode, which has been scaled in an integer unit for the sake of calculation convenience. That is, Table 2 shows the approximate values of tan θ for respective modes, and Table 3 shows the approximate values of the tan−1θ for respective modes. The intraPredAngle in Tables 2 and 3 is an angle between the vertical direction or the horizontal direction and the direction of the prediction mode. As the intraPredAngle value increases, the intra prediction mode becomes closer to the diagonal direction.

TABLE 2

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 29 | 26 | 23 | 21 | 19 | 17 | 15 | 13 | 11 | 9 | 7 | 5 | 3 | 2 | 1 |
| predModeIntra | 18 | 19 | 20 | 21 | 22 | 23 | 24 | 25 | 26 | 27 | 218 | 29 | 30 | 31 | 32 | 33 | 34 |
| intraPredAngle | 0 | 1 | 2 | 3 | 5 | 7 | 9 | 11 | 13 | 15 | 17 | 19 | 21 | 23 | 26 | 29 | 32 |
| predModeIntra | 35 | 36 | 37 | 38 | 39 | 40 | 41 | 42 | 43 | 44 | 45 | 46 | 47 | 48 | 49 | 50 | 51 |
| intraPredAngle | 29 | 26 | 23 | 21 | 19 | 17 | 15 | 13 | 11 | 9 | 7 | 5 | 3 | 2 | 1 | 0 | 1 |
| predModeIntra | 52 | 53 | 54 | 55 | 56 | 57 | 58 | 59 | 60 | 61 | 62 | 63 | 64 | 65 | 66 | | |
| intraPredAngle | 2 | 3 | 5 | 7 | 9 | 11 | 13 | 15 | 17 | 19 | 21 | 23 | 26 | 29 | 32 | | |

TABLE 3

| predModeIntra | 19 | 20 | 21 | 22 | 23 | 24 | 25 | 26 |
|---|---|---|---|---|---|---|---|---|
| invAngle | −8192 | −4065 | −2731 | −1638 | −1170 | −910 | −745 | −630 |
| predModeIntra | 27 | 28 | 29 | 30 | 31 | 32 | 33 | 34 |
| invAngle | −546 | −482 | −431 | −390 | −356 | −315 | −282 | −256 |
| predModeIntra | 35 | 36 | 37 | 38 | 39 | 40 | 41 | 42 |
| invAngle | −282 | −315 | −256 | −390 | −431 | −482 | −546 | −630 |
| predModeIntra | 43 | 44 | 45 | 46 | 47 | 48 | 49 | |
| invAngle | −745 | −710 | −1170 | −1630 | −2731 | −4096 | −8192 | |

Alternatively, as shown in FIG. 4B, when more prediction directions than the 66 prediction directions are applied, that is, when wide angles are further considered for the intra prediction, the intraPredAngle of Table 2 may become like that of Table 4.

TABLE 4

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

In order to predict a location of a fractional sample, an interpolation filter from integer pixels, that is, integer samples, should be used. The interpolation filter may be selectively determined depending on the size of the current block. When the width or height of the current block is less than or equal to 8, a cubic filter may be used, while, when the width or height of the current block is greater than or equal to 8, a Gaussian filter may be applied.

In addition, according to an example, the angular prediction mode may be classified into a vertical direction prediction mode if it is greater than or equal to the mode of no. 34 in FIG. 4, which is a reference, or into a horizontal direction prediction mode if it is less than the mode of no. 34 in FIG. 4. In the vertical direction prediction mode, the selection of the interpolation filter may be based on the width of the block, and in the horizontal direction prediction mode, the selection of the interpolation filter may be based on the height of the block.

Meanwhile, a DC mode, which is one of the non-angular modes, is a method of constructing a prediction block with an average value of reference pixels (reference samples) adjacent to the current block. If the pixels within the current block are homogeneous, effective prediction can be expected. Contrarily, when the reference pixels have different values, discontinuity may occur between the prediction block and the reference sample. In a similar situation, even when predicting with the angular prediction method, unintended visual contouring may occur, and thus, the planar mode prediction method may be used to compensate for this. The planar mode prediction method is to construct the prediction block by performing horizontal linear prediction and vertical linear prediction using a reference pixel, and then by averaging them.

Summing up the steps of generating the intra prediction signal, that is, prediction samples with reference to FIG. 5, the encoding apparatus may set a reference sample and interpolate, that is, smooth the reference sample value for the fractional sample in order to perform prediction, as described above with reference with FIGS. 6 and 7 (S521).

When smoothing for the reference sample is completed, that is, the fractional samples for the prediction are calculated, prediction according to the intra mode, that is, the prediction direction, may be performed on the current block (S522).

In this case, the encoding apparatus may perform a prediction sample filtering procedure (S530). The prediction sample filtering may be referred to as post filtering. Some or all of the prediction samples may be filtered by the prediction sample filtering procedure. In some cases, S530 procedure may be omitted.

For example, after constructing the prediction block, the encoding apparatus may perform post-processing filtering to alleviate discontinuity between the reference sample and the block boundary for the block predicted in the vertical direction (180 degrees), the horizontal direction (90 degrees), and the DC modes.

The encoding apparatus generates residual samples for the current block based on the (filtered) prediction sample (S540).

Thereafter, the residual samples may be transformed and quantized (S550).

The encoding apparatus may encode image information including prediction mode information representing the intra prediction mode, and the residual information on the residual samples (i.e. transformed and quantized residual samples) (S560).

The encoding apparatus may output the encoded image information in the form of a bitstream. The output bitstream may be transfer to the decoding apparatus through a storage medium or a network.

Meanwhile, the bitstream may be transmitted to the decoding apparatus through a network or a (digital) storage medium. Here, the network may include a broadcast network, a communication network and/or the like, and the digital storage medium may include various storage media, such as USB, SD, CD, DVD, Blu-ray, HDD, SSD, and the like.

FIG. 8 schematically represents an encoding apparatus performing an image encoding method according to the present document. The method disclosed in FIG. 5 may be performed by the encoding apparatus disclosed in FIG. 8. Specifically, for example, the predictor 810 of the encoding apparatus of FIG. 5 may perform S500 to S540 of FIG. 5, and the transformer 820 and the quantizer 830 of the encoding apparatus of FIG. 8 may perform S550 of FIG. 5, and the entropy encode of the encoding apparatus (not shown) may perform S560 of FIG. 5.

For prediction of the current block, the prediction mode information, a block size, and information on a reference sample may be input to the predictor 810. The reference sample may be subjected to smoothing, i.e., interpolation process for the fractional sample, and prediction and selective post-processing filtering may be performed.

Figure 9:
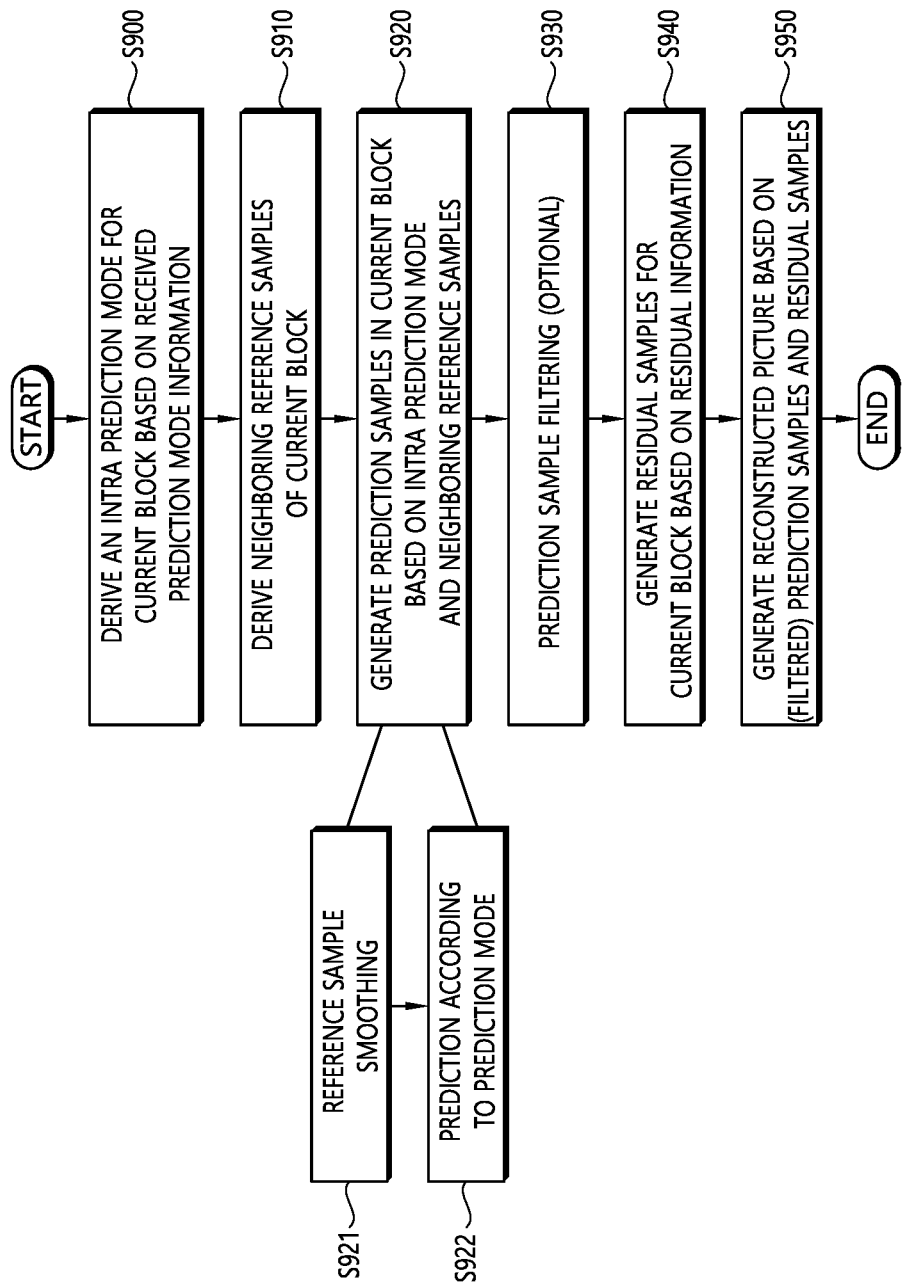
FIG. 9 is a control flowchart illustrating a decoding method to which intra prediction can be applied according to an embodiment of the present document.

FIG. 9 is a control flowchart illustrating a decoding method to which intra prediction can be applied according to an embodiment of the present document.

The decoding apparatus may perform an operation corresponding to the operation which has been performed in the encoding apparatus. The decoding apparatus may derive an intra prediction mode for the current block based on the received prediction mode information (S900).

The decoding apparatus may derive neighboring reference samples of the current block (S910).

When reconstructing a block to which the intra prediction has been applied, the decoding apparatus constructs a prediction block using neighboring pixels of the block, and combines it with the residual signal transmitted from the encoding apparatus. In order to generate a prediction sample of the current block according to the prediction mode, neighboring pixels, that is, reference samples, must be derived.

For example, assuming that the size of the current block is N, the maximum size of the reference pixel to which reference may be made when performing the intra prediction may be 2N pixels adjacent to the top, 2N pixels adjacent to the left side, and a corner pixel in the top-left corner.

The decoding apparatus generates prediction samples within the current block based on the intra prediction mode and the neighboring reference samples (S920).

If it is not possible to make reference to a reference pixel of an integer pixel unit, as shown in FIG. 7, the prediction block may be constructed by copying a pixel which has been interpolated using a distance ratio between two corresponding pixels and two pixels obtained by an angle.

In order to predict a location of a fractional sample, an interpolation filter from integer pixels, that is, integer samples, should be used. The interpolation filter may be selectively determined depending on the size of the current block. When the width or height of the current block is less than or equal to 8, a cubic filter may be used, while, when the width or height of the current block is greater than or equal to 8, a Gaussian filter may be applied.

In addition, according to an example, the angular prediction mode may be classified into a vertical direction prediction mode if it is greater than or equal to the mode of no. 34 in FIG. 4, which is a reference, or into a horizontal direction prediction mode if it is less than the mode of no. 34 in FIG. 4. In the vertical direction prediction mode, the selection of the interpolation filter may be based on the width of the block, and in the horizontal direction prediction mode, the selection of the interpolation filter may be based on the height of the block.

Meanwhile, a DC mode, which is one of the non-angular modes, is a method of constructing a prediction block with an average value of reference pixels (reference samples) adjacent to the current block. If the pixels within the current block are homogeneous, effective prediction can be expected. Contrarily, when the reference pixels have different values, discontinuity may occur between the prediction block and the reference sample. In a similar situation, even when predicting with the angular prediction method, unintended visual contouring may occur, and thus, the planar mode prediction method may be used to compensate for this. The planar mode prediction method is to construct the prediction block by performing horizontal linear prediction and vertical linear prediction using a reference pixel, and then by averaging them.

Summing up the steps of generating the prediction samples with reference to FIG. 9, the decoding apparatus may set a reference sample and interpolate, that is, smooth the reference pixel for the fractional sample in order to perform prediction, as described above with reference with FIGS. 6 and 7 (S921).

When smoothing for the reference sample is completed, that is, the fractional samples for the prediction are calculated, prediction according to the intra mode, that is, the prediction direction, may be performed on the current block (S922).

In this case, the decoding apparatus may perform a prediction sample filtering procedure (S930).

The prediction sample filtering may be referred to as post filtering. Some or all of the prediction samples may be filtered by the prediction sample filtering procedure. In some cases, S930 procedure may be omitted.

The decoding apparatus generates the residual samples for the current block based on the received residual information (S940).

The decoding apparatus may generate reconstructed samples for the current block based on the (filtered) prediction samples and the residual samples, and generate a reconstructed picture based on these reconstructed samples (S950).

Figure 10:
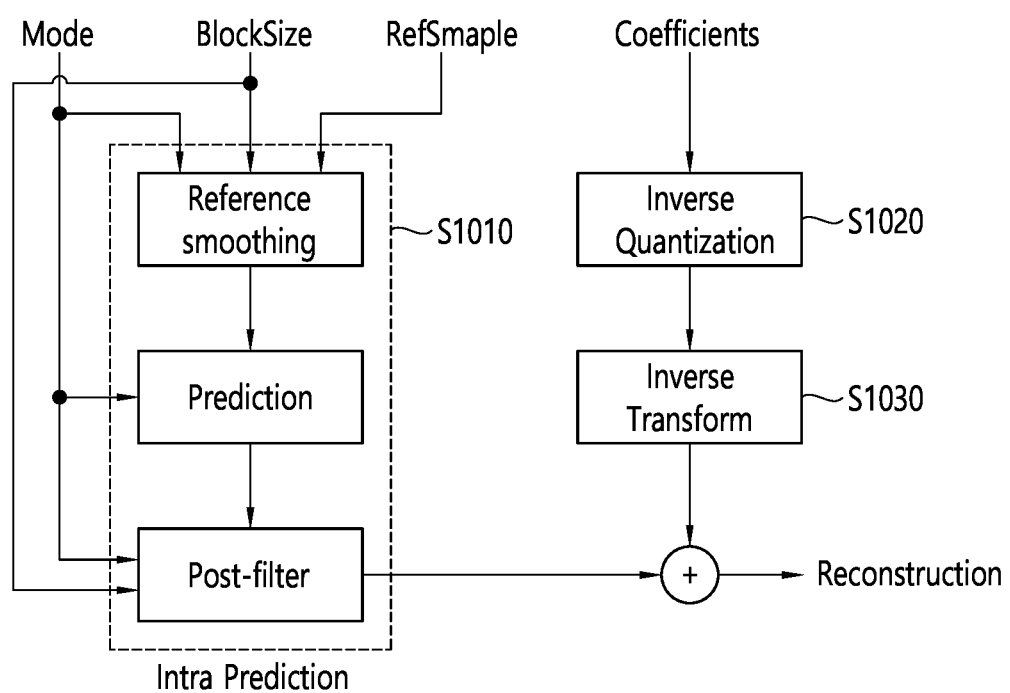
FIG. 10 schematically represents a decoding apparatus performing a decoding method according to FIG. 9.

FIG. 10 schematically represents a decoding apparatus performing an image decoding method according to the present document. The method disclosed in FIG. 9 may be performed by the decoding apparatus disclosed in FIG. 10. Specifically, for example, the predictor 1010 of the decoding apparatus of FIG. 10 may perform S900 to S930 of FIG. 9, and the adder 1040 of the decoding apparatus of FIG. 10 may perform S950 of FIG. 9. Further, although not shown, the process of obtaining and decoding image information including prediction information and/or information on residual of the current block through a bitstream may be performed by an entropy decoder of the decoding apparatus, and the process of deriving the residual sample for the current block based on the residual information (S740) may be performed by an dequantizer 1020 and an inverse transformer 1030 of the decoding apparatus of FIG. 10.

Meanwhile, hereinafter, in an embodiment of the document, based on the intra prediction method described with reference to FIGS. 4 to 10, a method of variably selecting an interpolation filter depending on the size and/or prediction mode of a target block to be predicted, that is, a current block is proposed.

As mentioned above, the distance between the reference sample and the prediction sample is determined depending on the prediction angle, that is, the slope of the prediction mode. As the prediction sample within the current block is located further toward the bottom-right direction, the distance between the prediction sample and the reference sample increases, while, as the intraPredAngle value defined in Table 2 increases, the slope of the prediction mode becomes closer to 45 degree, and the distance from the reference sample further increases. Also, since the distance between the reference sample and the prediction sample may also be determined by the size of the current block, the size of the block is also closely related to the accuracy of prediction.

In addition, when the value of intraPredAngle is greater than 0 and less than 32, prediction is performed from the position of a sub pel, that is, a fractional sample, as shown in FIG. 7. In this regard, since only pixel values at integer positions exist, the position of the fractional sample is first predicted using the interpolation filter, and then the predicted fractional sample value is copied to the prediction sample. Therefore, the accuracy of the prediction block may depend on the accuracy of the interpolation filter. Alternatively, in a case where a wide angle is applied and the intraPredAngle value is applied to Table 4, if the intraPredAngle is equal to or greater than 32, and is not a multiple of 32, prediction may be performed from the position of the fractional sample. In addition, when a Gaussian filter is applied as an interpolation filter, filter coefficients (filter coefficients at integer sample positions) may be interpolated even in integer samples.

However, during the intra prediction, information that may be used as the reference sample (reference sample value) is very limited to already reconstructed samples on the left side and top, as shown in FIG. 6, and the degree of correlation may rapidly decrease depending on the distance from the prediction sample. Therefore, it is effective to use the interpolation filter with a low-pass filter effect so that artifacts or noises of the reference sample are not propagated to the position of the prediction sample that is far from the reference sample, and conversely, if the distance between the reference sample and the prediction sample is close to each other, the correlation is high, and therefore, it may be advantageous to improvement of the prediction performance to construct a prediction block through accurate interpolation so as to maintain similarity as high as possible.

Therefore, the present embodiment proposes a method of selecting an interpolation filter as below.

1) Selecting an interpolation filter under the consideration of only the size of the current prediction block 2) Selecting an interpolation filter under the consideration of only the prediction mode applied to the current block 3) Selecting an interpolation filter considering the combination, i.e., both of the size of the current block and the prediction mode of the current block As an example, in a case where the intra prediction is performed on a 4×4 block, since the prediction samples within the current block having a block size of 4×4 exhibit a very high correlation with neighboring reference samples, a sophisticated interpolation filter may be used regardless of the prediction mode. That is, the interpolation filter may be selected under the consideration of only the size of the current block.

Alternatively, as an example, in the case of the prediction mode having an intraPredAngle value of 11 or greater in Table 2, which has been derived from the prediction mode of the current block regardless of the current block size, the interpolation filter with a low-pass filter effect may be used because the distance from the reference sample is increased. That is, the interpolation filter may be selected under the consideration of the prediction mode applied to the current block.

Alternatively, as another example, when the size of the current block is less than the predetermined block size, and the intraPredAngle value for the prediction mode is less than a specific value, a sophisticated interpolation filter is used, and otherwise an interpolation filter with a low-pass filter effect may be used. That is, when selecting the interpolation filter, both the size of the current block and the direction of the prediction mode may be considered. For example, the prediction angle between the direction of the prediction mode of the current block and the vertical direction or the horizontal direction may be compared with a predetermined threshold value, and the interpolation filter may be derived as either a first interpolation filter or said second interpolation filter depending on the comparison result of the prediction angle and the threshold value.

Alternatively, the reference of an intraPredAngle value for a prediction mode for selecting an interpolation filter in response to the size of the current block may be differently applied. That is, the threshold value may be set differently depending on the size of the current block.

Alternatively, it may be determined whether to apply the size of the current block to selecting an interpolation filter depending on the mode of the current block. For example, if the mode of the current block is a predetermined specific mode, the first interpolation filter may be selected, while, if the mode of the current block is not a predetermined mode, it may be determined whether to apply the first interpolation filter or the second interpolation filter by reconsidering the size of the current block. In this case, the predetermined mode may be a prediction mode indicating a diagonal direction, for example, prediction mode 2, 34, or 66.

Additionally, according to another example, when the prediction mode of the current block is derived as MPM, and is not the planar mode or DC mode, but the angular mode, the MPM mode for the current block and the interpolation filter used for the current block may be derived together. That is, the interpolation filter may be derived together with the MPM mode.

Additionally, when selecting the interpolation filter under the consideration of the prediction mode, a limitation on the prediction mode may be variable depending on the size of the current block and/or the shape of the current block. For example, in a case where the size of the current block as the reference is 8, when the intraPredAngle value is less than or equal to 11, the sophisticated interpolation filter may be used. Alternatively, in a case where the size of the current block is 16 or more, when the intraPredAngle value is less than or equal to 5 with the intraPredAngle value of 5 as a reference value, the sophisticated interpolation filter is used.

According to an embodiment of the present document, a spline filter or a cubic filter may be used as the above-described sophisticated interpolation filter. In addition, as an interpolation filter with a low-pass filter effect, the linear filter or the Gaussian filter may be used.

Figure 11:
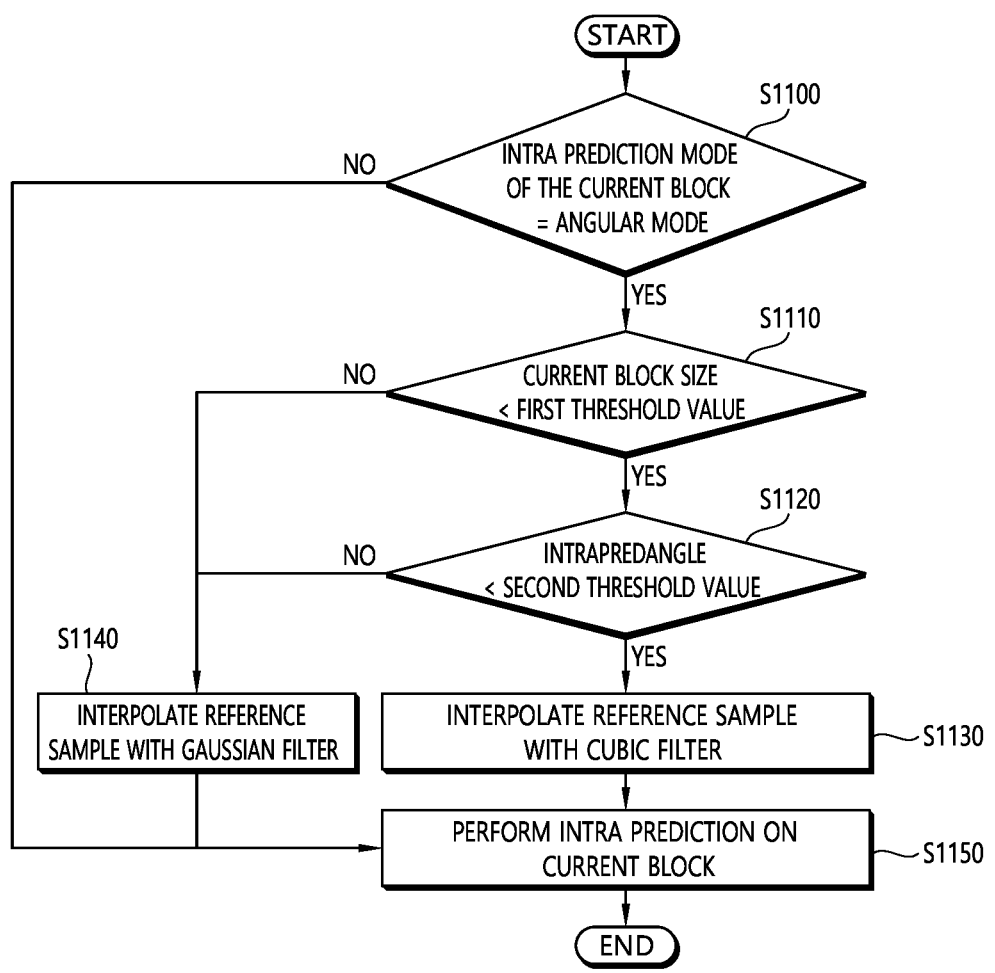
FIG. 11 is a control flowchart illustrating an intra prediction method according to an embodiment of the present document.

FIG. 11 is a control flowchart illustrating an intra prediction method according to an embodiment of the present document. Referring to FIG. 11, the intra prediction method using the reference filter described above is summarized as below. FIG. 11 may be performed by the above-described predictor of the encoding apparatus and the decoding apparatus.

First, the predictor may determine whether the intra prediction mode of the current block is an angle prediction mode, that is, an angular prediction mode (S1100).

As a result of the determination, if the intra prediction mode of the current block is the angular mode, it may be determined whether the size of the current block is less than a predetermined first threshold value (S1110).

In contrast, as a result of the determination, if the intra prediction mode of the current block is not the angular mode but the non-angular mode, that is, the planar mode or the DC mode, the predictor may perform intra prediction on the current block based on the reference samples (S1150).

Meanwhile, if the size of the current block is less than a predetermined threshold value, it may be determined whether a value indicating a prediction direction for the current block, that is, the intraPredAngle value of Table 2 is less than a predetermined second threshold value (S1120).

If the size of the current block is less than the predetermined first threshold value, a sophisticated interpolation filter, for example, a cubic filter, may be used as a filter for interpolating the reference sample of the current block (S1130).

On the other hand, if the size of the current block is equal to or greater than the first threshold (S1110), and the intraPredAngle value is equal to or greater than the second threshold (S1120), the predictor may use a low-pass filter, e.g., a Gaussian filter, to interpolate the reference sample (S1140).

The determining steps depending on the first threshold value and the second threshold value of FIG. 11 are exemplary, and in S1110, it may be determined whether the size of the current block is less than or equal to the first threshold value, rather than whether it is less than the first threshold value, and In S1120, it may be determined whether the intraPredAngle value is less than or equal to the second threshold value, rather than whether it is less than the second threshold value.

When the filter for interpolating the reference sample is derived, the predictor may derive a prediction sample for the current block by performing intra prediction on the current block (S1150).

Alternatively, according to another embodiment of the present document, based on the intra prediction method described with reference to FIGS. 4 to 10, a method of variably selecting an interpolation filter depending on the size and/or prediction mode of a target block to be predicted, that is, a current block, is proposed.

As mentioned above, the distance between the reference sample and the prediction sample is determined depending on the prediction angle, that is, the slope of the prediction mode. As the prediction sample within the current block is located further toward the bottom-right direction, the distance between the prediction sample and the reference sample increases, while, as the intraPredAngle value defined in Table 2 increases, the slope of the prediction mode becomes closer to 45 degree, and the distance from the reference sample further increases. Also, since the distance between the reference sample and the prediction sample may also be determined by the size of the current block, the size of the block is also closely related to the accuracy of prediction.

In addition, when the value of intraPredAngle is greater than 0 and less than 32, prediction is performed from the position of a sub pel, that is, a fractional sample, as shown in FIG. 7. In this regard, since only pixel values at integer positions exist, the position of the fractional sample is first predicted using the interpolation filter, and then the predicted fractional sample value is copied to the prediction sample. Therefore, the accuracy of the prediction block may depend on the accuracy of the interpolation filter. Alternatively, in a case where a wide angle is applied and the intraPredAngle value is applied to Table 4, if the intraPredAngle is equal to or greater than 32, and is not a multiple of 32, prediction may be performed from the position of the fractional sample. In addition, when a Gaussian filter is applied as an interpolation filter, filter coefficients (filter coefficients at integer sample positions) may be interpolated even in integer samples.

However, during the intra prediction, information that may be used as the reference sample (reference sample value) is very limited to already reconstructed samples on the left side and top, as shown in FIG. 6, and the degree of correlation may rapidly decrease depending on the distance from the prediction sample. Therefore, it is effective to use the interpolation filter with a low-pass filter effect so that artifacts or noises of the reference sample are not propagated to the position of the prediction sample that is far from the reference sample, and conversely, if the distance between the reference sample and the prediction sample is close to each other, the correlation is high, and therefore, it may be advantageous to improvement of the prediction performance to construct a prediction block through accurate interpolation so as to maintain similarity as high as possible.

Therefore, the present embodiment proposes a method of selecting an interpolation filter as below.

1) Selecting an interpolation filter under the consideration of only the size of the current prediction block 2) Selecting an interpolation filter under the consideration of only the prediction mode applied to the current block 3) Setting an area in the current block, and selecting an interpolation filter depending on the distance from the reference sample 4) Selecting the interpolation filter depending on the distance between the reference sample and the prediction target sample within the current block 5) Selecting an interpolation filter by the combination of 1), 2), 3) and 4)

As an example, in a case where the intra prediction is performed on a 4×4 block, since the prediction samples within the current block having a block size of 4×4 exhibit a very high correlation with neighboring reference samples, a sophisticated interpolation filter may be used regardless of the prediction mode. That is, the interpolation filter may be selected under the consideration of only the size of the current block.

Alternatively, as an example, in the case of the prediction mode having an intraPredAngle value of 11 or greater in Table 2, which has been derived from the prediction mode of the current block regardless of the current block size, the interpolation filter with a low-pass filter effect may be used because the distance from the reference sample is increased. That is, the interpolation filter may be selected under the consideration of the prediction mode applied to the current block.

Alternatively, as another example, when the size of the current block is less than the predetermined block size, and the intraPredAngle value for the prediction mode is less than a specific value, a sophisticated interpolation filter is used, and otherwise an interpolation filter with a low-pass filter effect may be used. That is, when selecting the interpolation filter, both the size of the current block and the direction of the prediction mode may be considered. For example, the prediction angle between the direction of the prediction mode of the current block and the vertical direction or the horizontal direction may be compared with a predetermined threshold value, and the interpolation filter may be derived as either a first interpolation filter or said second interpolation filter depending on the comparison result of the prediction angle and the threshold value.

Alternatively, the reference of an intraPredAngle value for a prediction mode for selecting an interpolation filter in response to the size of the current block may be differently applied. That is, the threshold value may be set differently depending on the size of the current block.

Additionally, according to another example, when the prediction mode of the current block is derived as MPM, and is not the planar mode or DC mode, but the angular mode, the MPM mode for the current block and the interpolation filter used for the current block may be derived together. That is, the interpolation filter may be derived together with the MPM mode.

Alternatively, the reference of an intraPredAngle value for a prediction mode for selecting an interpolation filter in response to the size of the current block may be differently applied.

Alternatively, it may be determined whether to apply the size of the current block to selecting an interpolation filter depending on the mode of the current block. For example, if the mode of the current block is a predetermined specific mode, the first interpolation filter may be selected, while, if the mode of the current block is not a predetermined mode, it may be determined whether to apply the first interpolation filter or the second interpolation filter by reconsidering the size of the current block. In this case, the predetermined mode may be a prediction mode indicating a diagonal direction, for example, prediction mode 2, 34, or 66.

In addition, according to another example, when the size of the current block is greater than or equal to a specific value, the block may be divided into regions, and an interpolation filter may be selected depending on a distance between the region and a reference sample. The size of the region may be a fixed value promised between the encoding apparatus and the decoding apparatus, or may be derived by the prediction mode and/or the size of a block (Implicitly defined). As an example, when the intra prediction mode is a vertical direction prediction block greater than or equal to 34, 16×16 may be divided into 16 4×4 blocks, and then the prediction may be performed on the regions of from 0 to 7 in raster scan order by using a reference sample interpolated with a sophisticated filter, and after that, the prediction may be performed on the remaining regions by using a reference sample using an interpolation filter with a low-pass filter effect.

Alternatively, information on the size of a region and an individual interpolation filter applicable to each region may be explicitly signaled from the encoding apparatus to the decoding apparatus.

Alternatively, according to another example, the kind of the interpolation filter may be determined by comparing a distance between a reference sample and a prediction sample within a current block to be predicted with a specific threshold value. In other words, the separation distance between the prediction sample and the reference sample may be compared with a predetermined threshold value, and the interpolation filter may be derived as either a first interpolation filter or a second interpolation filter depending on a comparison result of the separation distance and the threshold value.

Meanwhile, information on a distance between a prediction sample and a reference sample, which determines an interpolation filter may be derived in various ways depending on a block size, a prediction mode, and whether the prediction block is a square/nonsquare block. In this case, the separation distance may be derived based on the prediction mode of the current block, and the threshold value may be set based on the size of the current block.

For example, if the size of the current block is N, and distance between the reference sample and the prediction sample within the prediction block is N/2 or greater, then an interpolation filter with a low-pass filter effect may be used, and otherwise, a sophisticated interpolation filter may be used on a sample.

That is, when the separation distance exceeds the threshold value, the interpolation filter is derived as the first interpolation filter, and when the separation distance is equal to or less than the threshold value, the interpolation filter may be derived as the second interpolation filter, and the first interpolation filter may be a Gaussian filter and the second interpolation filter may be a cubic filter.

Alternatively, information on a threshold value for a distance between a prediction sample and a reference sample, which determines an interpolation filter, may be transmitted from the encoding apparatus to the decoding apparatus.

According to an embodiment of the present document, a spline filter or a cubic filter may be used as the above-described sophisticated interpolation filter. In addition, as an interpolation filter with a low-pass filter effect, the linear filter or the Gaussian filter may be used.

Figure 12:
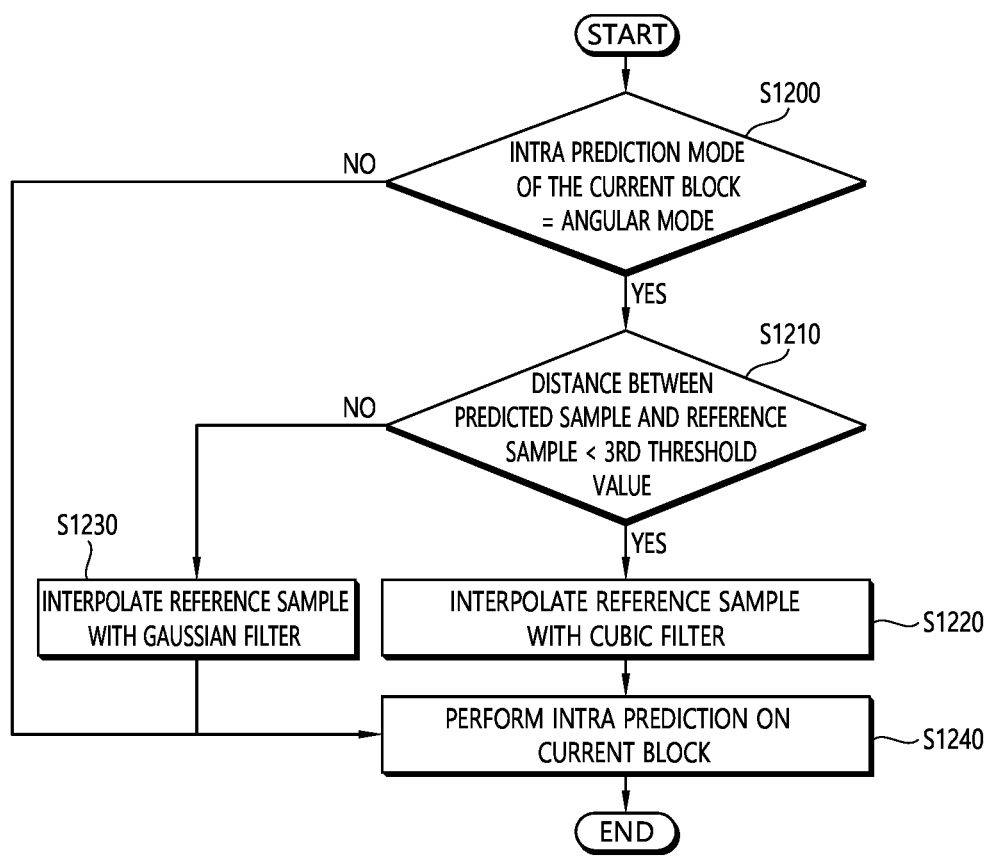
FIG. 12 is a control flowchart illustrating an intra prediction method according to another embodiment of the present document.

FIG. 12 is a control flowchart illustrating an intra prediction method according to another embodiment of the present document. Referring to FIG. 12, the intra prediction method using the reference filter described above is summarized as below. FIG. 12 may be performed by the above-described predictor of the encoding apparatus and the decoding apparatus.

First, the predictor may determine whether the intra prediction mode of the current block is an angle prediction mode, that is, an angular prediction mode (S1200).

As a result of the determination, if the intra prediction mode of the current block is the angular mode, the predictor may determine whether the distance between the reference sample and the prediction sample within the current block is less than a predetermined third threshold value (S1210).

In contrast, as a result of the determination, if the intra prediction mode of the current block is not the angular mode but the non-angular mode, that is, the planar mode or the DC mode, the predictor may perform intra prediction on the current block based on the reference samples (S1240).

If the distance between the prediction sample and the reference sample is less than the third threshold value, a sophisticated interpolation filter, for example, a cubic filter, may be used as a filter for interpolating the reference sample of the current block (S1220).

Contrarily, if the size of the current block is equal to or greater than the third threshold value (S1210), the predictor may interpolate the reference sample using a low-pass filter, for example, a Gaussian filter (S1230).

As described above, according to the present embodiment, the kind of the interpolation filter may be determined by comparing a distance between a reference sample and a prediction sample within a current block to be predicted with a specific threshold value. In other words, the separation distance between the prediction sample and the reference sample may be compared with a predetermined threshold value, and the interpolation filter may be derived as either a first interpolation filter or a second interpolation filter depending on a comparison result of the separation distance and the threshold value.

Meanwhile, information on a distance between a prediction sample and a reference sample, which determines an interpolation filter may be derived in various ways depending on a block size, a prediction mode, and whether the prediction block is a square/nonsquare block. In this case, the separation distance may be derived based on the prediction mode of the current block, and the threshold value may be set based on the size of the current block. Since the distance between the prediction sample and the reference sample increases as the prediction mode of the current block becomes far away from the vertical or horizontal direction, the prediction mode of the current block may be considered when determining the separation distance. Further, as the size of the current block increases, the separation distance between the reference sample and the bottom right samples of the current block increases. Therefore, the size of the current block may also be considered when determining the separation distance.

For example, if the size of the current block is N, and the distance between the reference sample and the prediction sample within the prediction block is N/2 or greater, then an interpolation filter with a low-pass filter effect may be used, and otherwise, a sophisticated interpolation filter may be used on a sample.

That is, when the separation distance exceeds the threshold value, the interpolation filter is derived as the first interpolation filter, and when the separation distance is equal to or less than the threshold value, the interpolation filter may be derived as the second interpolation filter, and the first interpolation filter may be a Gaussian filter and the second interpolation filter may be a cubic filter.

Alternatively, according to an example, in order to determine the distance between the prediction sample and the reference sample, the prediction angle between the direction of the prediction mode of the current block and the vertical direction or the horizontal direction may be compared with a predetermined threshold value, and the interpolation filter may be derived as either a first interpolation filter or said second interpolation filter depending on the comparison result of the prediction angle and the threshold value. In this regard, the threshold value may be set differently depending on the size of the current block.

Meanwhile, the interpolation filter according to the present embodiment may be a 4-tap filter.

Information on a threshold for a distance or a prediction angle between a prediction sample and a reference sample, which determines the interpolation filter, may be transmitted from the encoding apparatus to the decoding apparatus, or may be derived from the encoding apparatus and the decoding apparatus by a predetermined table.

When the filter for interpolating the reference sample is derived, the predictor may derive a prediction sample for the current block by performing intra prediction on the current block (S1240).

Alternatively, according to another embodiment of the present document, based on the intra prediction method described with reference to FIGS. 4 to 10, a method is proposed in which fractional samples are generated using two or more types of interpolation filters, a prediction value is created using reference samples generated by a plurality of interpolation filters, and then the prediction values are weighted summed and used as a final prediction block.

As mentioned above, the distance between the reference sample and the prediction sample is determined depending on the prediction angle, that is, the slope of the prediction mode. As the prediction sample within the current block is located further toward the bottom-right direction, the distance between the prediction sample and the reference sample increases, while, as the intraPredAngle value defined in Table 2 increases, the slope of the prediction mode becomes closer to 45 degree, and the distance from the reference sample further increases. Also, since the distance between the reference sample and the prediction sample may also be determined by the size of the current block, the size of the block is also closely related to the accuracy of prediction.

In addition, when the value of intraPredAngle is greater than 0 and less than 32, prediction is performed from the position of a sub pel, that is, a fractional sample, as shown in FIG. 7. In this regard, since only pixel values at integer positions exist, the position of the fractional sample is first predicted using the interpolation filter, and then the predicted fractional sample value is copied to the prediction sample. Therefore, the accuracy of the prediction block may depend on the accuracy of the interpolation filter. Alternatively, in a case where a wide angle is applied and the intraPredAngle value is applied to Table 4, if the intraPredAngle is equal to or greater than 32, and is not a multiple of 32, prediction may be performed from the position of the fractional sample. In addition, when a Gaussian filter is applied as an interpolation filter, filter coefficients (filter coefficients at integer sample positions) may be interpolated even in integer samples.

However, during the intra prediction, information that may be used as the reference sample (reference sample value) is very limited to already reconstructed samples on the left side and top, as shown in FIG. 6, and the degree of correlation may rapidly decrease depending on the distance from the prediction sample. Therefore, it is effective to use the interpolation filter with a low-pass filter effect so that artifacts or noises of the reference sample are not propagated to the position of the prediction sample that is far from the reference sample, and conversely, if the distance between the reference sample and the prediction sample is close to each other, the correlation is high, and therefore, it may be advantageous to improvement of the prediction performance to construct a prediction block through accurate interpolation so as to maintain similarity as high as possible.

Accordingly, in the present embodiment, there is proposed a method of constructing fractional samples from a plurality of interpolation filters through the following process, and generating a prediction block for a current block by using the same.

1) Constructing a fractional sample from a filter that performs sophisticated interpolation 2) Constructing a fractional sample from an interpolation filter with low-pass filter characteristics 3) Constructing a fractional sample from an interpolation filter other than 1) and 2)

4) Using as the final prediction block by utilizing 1), 2), and 3)

The detailed method for process 4) is as below.

A) Using the average block of 1) or 2) or 3) as a final prediction block

B) Using the weighted average block of 1) or 2) or 3) as a final prediction block C) Selecting one among 1), 2), or various combinations of 3) and 4) and using it as the final prediction block As an example, when predicting for an angular mode that performs intra prediction from the position of a fractional sample (all angular modes except intra prediction modes 2, 18, 34, 50, and 66 in FIG. 4), a prediction block is constructed after interpolation is performed with a cubic filter and a Gaussian filter, respectively. After that, the average sum of respective prediction blocks may be used as a final prediction block.

Alternatively, using the characteristic of intra prediction that the closer the distance between the reference sample and the prediction sample within the current block is, the higher the prediction accuracy is, a weighted sum prediction block may be used in proportion to the distance between the prediction sample and the reference sample. For example, if the prediction samples are located close to the reference sample, the prediction sample made with 1) may be given more weight, and more weight may be given to the prediction sample constructed from 2) as the distance between the prediction sample and the reference sample increases, and then the final prediction block may be generated by summing them.

Distance information for determining a weight may be calculated by an encoding apparatus and a decoding apparatus, or a table set depending on a block size and a prediction mode may be referred to.

In addition, the proposed method according to the present embodiment can be selectively applied depending on various conditions. For example, an interpolation filter may be selectively set in response to a block size to be predicted, a prediction mode, a variance of a reference sample value, etc., and for this, the block size, prediction mode, and variance values of the reference sample value may be derived by the decoding apparatus, or may be received as flag information from the encoding apparatus.

Figure 13:
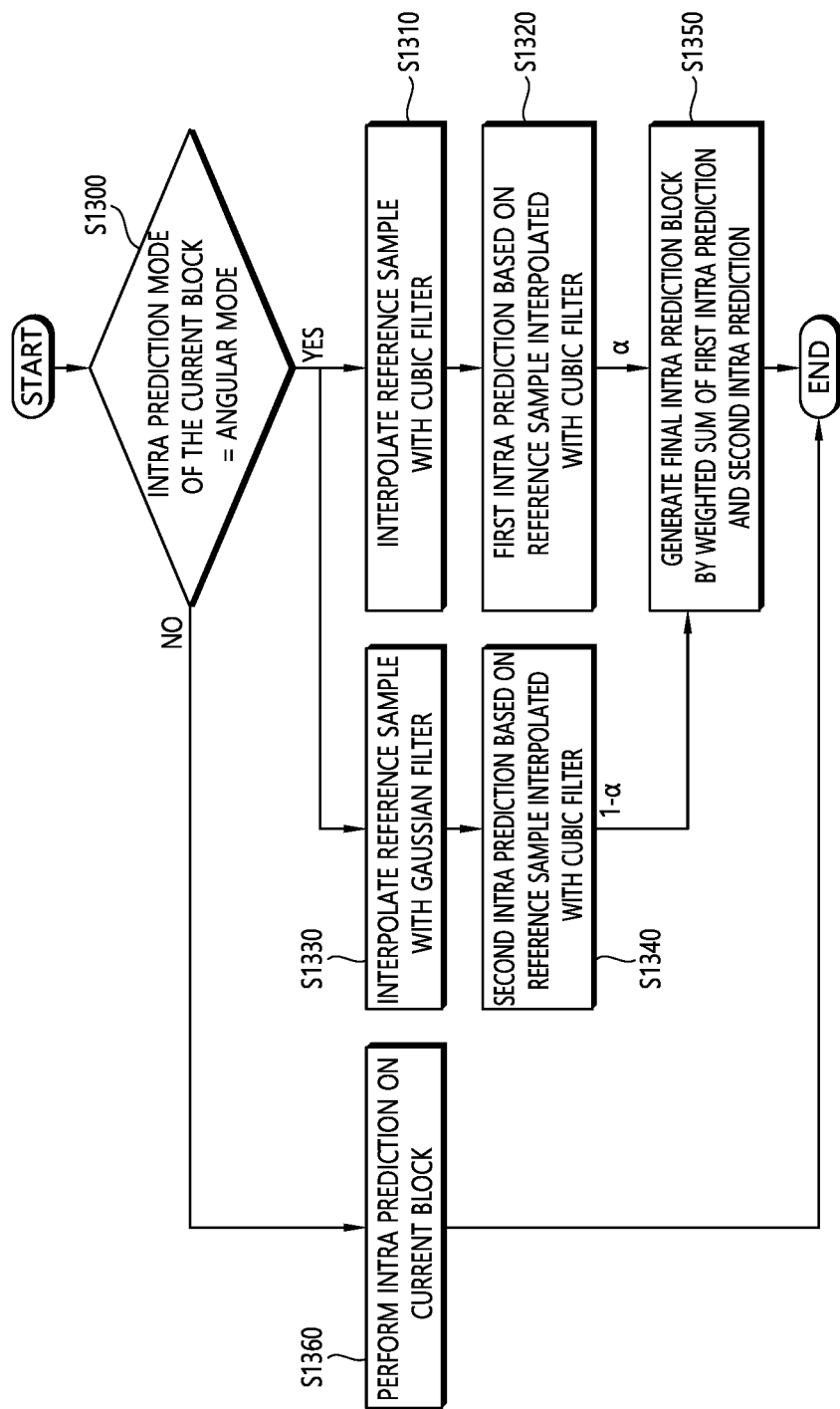
FIG. 13 is a control flowchart illustrating an intra prediction method according to still another embodiment of the present document.

FIG. 13 is a control flowchart illustrating an intra prediction method according to still another embodiment of the present document. Referring to FIG. 13, the intra prediction method using the reference filter described above is summarized as below. FIG. 13 may be performed by the above-described predictor of the encoding apparatus and the decoding apparatus.

First, the predictor may determine whether the intra prediction mode of the current block is an angle prediction mode, that is, an angular prediction mode (S1300).

As a result of the determination, if the intra prediction mode of the current block is an angular mode, the predictor may primarily interpolate the reference sample with a cubic filter (S1310), and perform the first intra prediction based on the reference sample interpolated with the cubic filter (S1320). That is, the predictor may generate the first intra prediction block by using the reference sample interpolated by using a sophisticated filter such as a cubic filter.

In addition, if the intra prediction mode of the current block is an angular mode, the predictor may secondarily interpolate the reference sample with a Gaussian filter (S1330), and perform the second intra prediction based on the reference sample interpolated with the Gaussian filter (S1340). That is, the predictor may generate the 21st intra prediction block using a reference sample interpolated using a low filter band filter such as a Gaussian filter.

Thereafter, the predictor may generate a final intra prediction block by a weighted sum of the first intra prediction and the second intra prediction (S1350).

In this case, as shown in FIG. 13, a weight α may be applied to the first intra prediction, and a weight (1−α) may be applied to the second intra prediction. As described above, the weight α may vary depending on the distance between the reference sample and the prediction samples, and information on the weight may be explicitly transmitted or derived from the encoding apparatus and the decoding apparatus.

In contrast, in S1300, if it is determined that the intra prediction mode of the current block is not the angular mode but the non-angular mode, that is, the planar mode or the DC mode, the predictor may perform intra prediction on the current block based on the reference samples (S1360).

Hereinafter, there is proposed a method of reconstructing a buffer of a reference sample when the size of the interpolation filter that can be used in the above-described embodiment is 2 or greater.

If the size of the interpolation filter is 2, the sub pel is interpolated using two integer pels that are closest to the sub pel that is the intersection point of the prediction angle and the reference sample, and prediction is performed using this. When the size of the sub pel is a, the index of the integer pel may be obtained with FLOOR(a) and FLOOR(a)+1 (FLOOR means discard). In this case, the size of the maximum reference sample may be resolved by 2*WIDTH+1 or 2*HEIGHT+1. However, when interpolation is performed using two or more reference samples, the maximum reference sample size may increase to 2*WIDTH+(SIZE−1) or 2*HEIGHT+(SIZE−1).

In addition, the reference sample may be reconstructed depending on whether the prediction angle is a negative number or a positive number. When the prediction angle is a negative number, it means the angle defined in Table 3 (the modes of from Nos. 19 to 49 in which the approximate value of tan−1θ is defined). In general, a main reference sample may be designated depending on whether a property of a prediction angle mainly performs prediction on a top reference sample or a left reference sample. However, when the prediction angle is a negative number, angle prediction may be performed by constructing a buffer in advance using a side reference sample according to the prediction angle in the main reference sample buffer.

Figure 14:
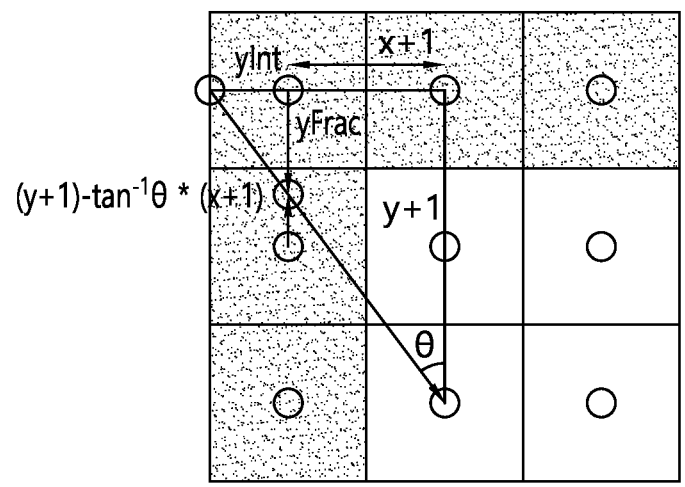
FIG. 14 is a diagram illustrating how a reference sample is obtained when a prediction angle is a negative number according to an example.

FIG. 14 is a diagram illustrating how a reference sample is obtained when a prediction angle is a negative number according to an example.

Referring to FIG. 14, a value for a prediction sample currently being predicted may be generated using a two-tap filter which has been applied in HEVC, and this may be calculated with reference to the following equation.

$$yInt = Flood(y+1) - \tan^{-1}\Theta*(x+1)$$

$$yFrac = (y+1) - \tan^{-1}\Theta*(x+1) - yInt$$

$$predSample = (1 - yFrac)*p[yInt] + yFrac*p[yInt+1] \quad \text{[Equation 1]}$$

As shown in FIG. 14, by padding in advance the side reference sample to be used in the currently predicted pixel as the main reference sample, prediction of a negative number angle may be performed with only the predAngleIntra variable in Table 3 without additional calculation. Likewise, the main reference sample buffer may be reconstructed to utilize only the reference pixel used for prediction of the positive number angle.

In this regard, when reconstructing the main reference sample buffer, only pixels necessary for prediction are input. Although a reference sample of 2*WIDTH+1 or 2*HEIGHT+1 size is constructed before reaching the prediction module, the main reference sample buffer is reconstructed for easy prediction value calculation.

Meanwhile, according to another embodiment of the present document, when a plurality of lines as reference samples, that is, a plurality of reference samples adjacent to a block to be currently predicted, are used for intra prediction, the reference pixel may become longer than 2*WIDTH+1, while, when intra prediction coding is performed by dividing a block to be currently coded in a horizontal direction or vertical direction during intra prediction, such as an ISP (Intra Sub-Partitions prediction), reference samples whose number is other than 2*WIDTH+1 may be used because the length of the coding unit may become different from the length of the transform unit.

If the prediction angle is a negative number, and the interpolation method is performed with two reference pixels, then a buffer having a size of WIDTH+HEIGHT+1 was constructed. However, in the case of being equal to or greater than that, a greater buffer should be allocated to deal with the worst case, so that no empty buffer (hole) may occur.

In this embodiment, the constructing of a 4-tap interpolation filter will be described as an example. In this regard, when the reference samples are designated as x0, x1, x2, and x3, it is assumed that the sub pel exists between x1 and x2.

Figure 15:
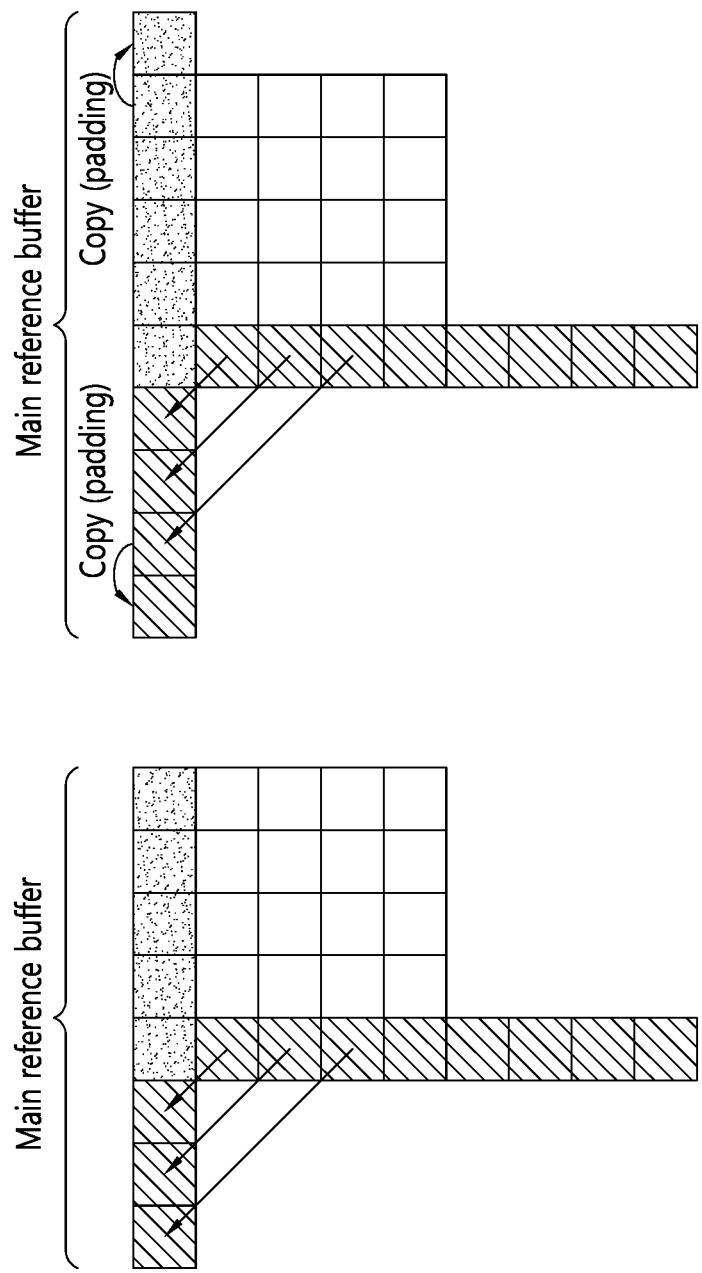
FIGS. 15 and 16 are diagrams illustrating how to perform padding depending on a negative angle and a positive angle when constructing a main reference sample buffer according to an example of the present document.
Figure 16:
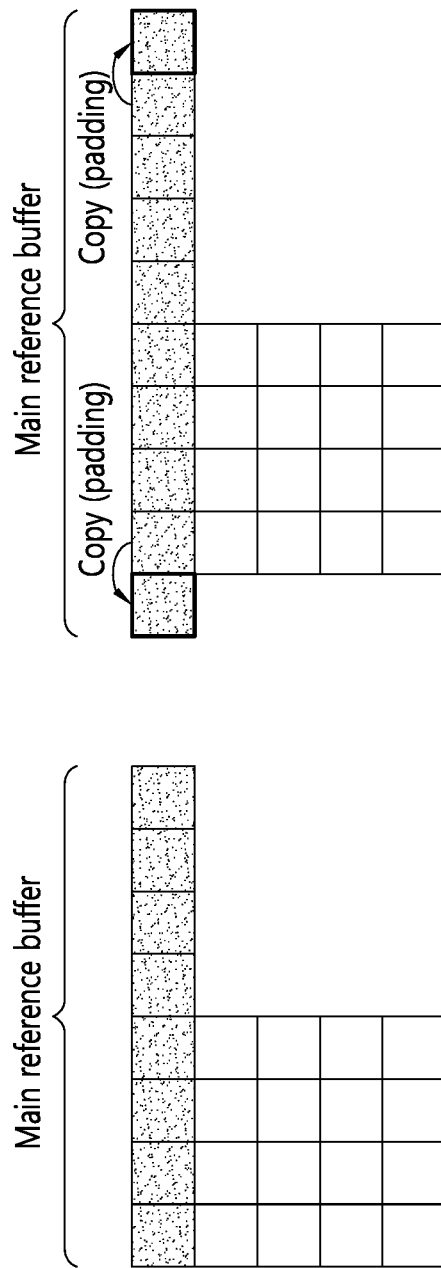

FIGS. 15 and 16 are diagrams illustrating how to perform padding depending on a negative angle and a positive angle when constructing a main reference sample buffer according to an example of the present document. FIG. 15 shows padding the reference sample at a negative angle, and FIG. 16 shows padding the reference sample at a positive angle.

According to FIGS. 15 and 16, the main reference sample buffer is constructed in the same way as when the interpolation filter is 2, wherein the padding is performed on pixels that do not exist, in order to utilize the 4-tap filter.

In the case of the left main reference sample buffer of FIG. 15, a 2-tap filter is illustrated as an example, and in the case of the main reference sample buffer on the right side of FIG. 15, in order to utilize a 4-tap filter in a reference buffer such as a 2-tap filter, it is shown as an example that a pixel value that does not exist is padded (copied).

In the case of the left main reference sample buffer of FIG. 16, a 2-tap filter is illustrated as an example, and in the case of the main reference sample buffer on the right side of FIG. 16, in order to utilize a 4-tap filter in a reference buffer such as a 2-tap filter, it is shown as an example that a pixel value that does not exist is padded (copied).

Figure 18:
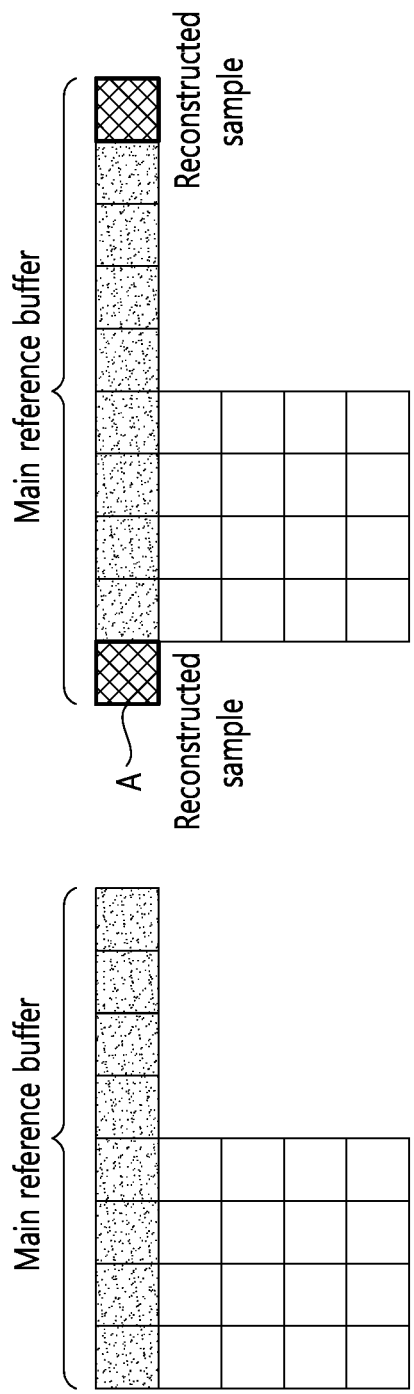

FIGS. 17 and 18 are diagrams illustrating how to perform padding depending on a negative angle and a positive angle when constructing a main reference sample buffer according to another example of the present document. FIG. 17 shows padding the reference sample at a negative angle, and FIG. 18 shows padding the reference sample at a positive angle.

According to FIGS. 17 and 18, the main reference sample buffer is constructed in the same way as when the interpolation filter is 2, wherein, if a sample that has already been decoded in the neighbor is available to utilize a 4-tap filter, it is used as a prediction sample. Sample A of FIGS. 17 and 18 shows samples that have already been restored.

In the case of the left main reference sample buffer of FIG. 17, a 2-tap filter is illustrated as an example, and in the case of the main reference sample buffer on the right side of FIG. 17, in order to utilize a 4-tap filter in a reference buffer such as a 2-tap filter, it is shown as an example that samples that have already been reconstructed are utilized.

In the case of the left main reference sample buffer of FIG. 18, a 2-tap filter is illustrated as an example, and in the case of the main reference sample buffer on the right side of FIG. 18, in order to utilize a 4-tap filter in a reference buffer such as a 2-tap filter, it is shown as an example that samples that have already been reconstructed are utilized.

Meanwhile, according to another example, a method of padding a reference sample and a method of using a reconstructed sample may be used in place of each other depending on the size of the block to be predicted, the prediction angle, and the control at a high level. For example, in the case of a side sample (side reference) that is padded beyond height−1 in FIG. 17 described above, padding is performed, wherein it is also possible to make the most use of the reconstructed pixels available in the main reference sample.

Meanwhile, a 4-tap interpolation filter among interpolation filters that can be used in the intra prediction method described in the present document will be exemplarily described below.

When the fractional sample is in 1/32 pixel unit, the prediction sample within the prediction target block is as the following equation.

$$p[x][y]=(f[0]*\text{ref}[x+i\text{Idx}]+f[1]*\text{ref}[x+i\text{Idx}+1]+f[2]*\text{ref}[x+i\text{Idx}+2]+f[3]*\text{ref}[x+i\text{Idx}+3]+128)>>8 \quad \text{[Equation 2]}$$

Where p[x][y] denotes a sample position in the prediction block, ref[x] denotes a reference sample, and iIdx is an integer index of a point that intersects the reference sample when mapped to the prediction mode (angle) in p[x][y], and may be represented by iIdx=((y+1)*intraPredAngle)>>5. f[n], n=0, 1, 2, 3 represents the filter coefficients of the interpolation filter.

Further, according to an embodiment of the present document, in a case where a plurality of reference sample lines are used for intra prediction, if it is instructed with refidx to represent whether any reference line is used or not, iIdx of Equation 2 may be modified as in Equation 3 below.

$$i\text{Idx}=(((y+1+\text{refIdx})*\text{intraPredAngle})>>5)+\text{refIdx} \quad \text{[Equation 3]}$$

The coefficients of the cubic filter, which is a sophisticated interpolation filter, and the Gaussian filter, which is a smoothed interpolation filter with low-pass filter characteristics, are shown in Table 5 below. Table 6 shows coefficients of a Gaussian filter according to another example.

TABLE 5

| Sub-pel position n/32 | Cubic filter {f[0], f[1], f[2], f[3]} | Gaussian filter {f[0], f[1], f[2], f[3]} |
| --- | --- | --- |
| n = 1  | {−3, 252, 8, −1}    | {43, 161, 51, 1}   |
| n = 2  | {−5, 247, 17, −3}   | {40, 160, 54, 2}   |
| n = 3  | {−7, 242, 25, −4}   | {37, 159, 58, 2}   |
| n = 4  | {−9, 236, 34, −5}   | {34, 158, 62, 2}   |
| n = 5  | {−10, 230, 43, −7}  | {31, 156, 67, 2}   |
| n = 6  | {−12, 224, 52, −8}  | {28, 154, 71, 3}   |
| n = 7  | {−13, 217, 61, −9}  | {26, 151, 76, 3}   |
| n = 8  | {−14, 210, 70, −10} | {23, 149, 80, 4}   |
| n = 9  | {−15, 203, 79, −11} | {21, 146, 85, 4}   |
| n = 10 | {−16, 195, 89, −12} | {19, 142, 90, 5}   |
| n = 11 | {−16, 187, 98, −13} | {17, 139, 94, 6}   |
| n = 12 | {−16, 179, 107, −14} | {16, 135, 99, 6}  |
| n = 13 | {−16, 170, 116, −14} | {14, 131, 104, 7} |
| n = 14 | {−17, 162, 126, −15} | {13, 127, 108, 8} |
| n = 15 | {−16, 153, 135, −16} | {11, 123, 113, 9} |
| n = 16 | {−16, 144, 144, −16} | {10, 118, 118, 10} |
| n = 17 | {−16, 135, 153, −16} | {9, 118, 126, 11} |
| n = 18 | {−15, 126, 162, −17} | {8, 106, 127, 13} |
| n = 19 | {−14, 116, 170, −16} | {7, 104, 131, 14} |
| n = 20 | {−14, 107, 179, −16} | {6, 99, 135, 16}  |
| n = 21 | {−13, 98, 187, −16}  | {6, 94, 139, 17}  |
| n = 22 | {−12, 89, 195, −16}  | {5, 90, 142, 19}  |
| n = 23 | {−11, 79, 203, −15}  | {4, 85, 146, 21}  |
| n = 24 | {−10, 70, 210, −14}  | {4, 80, 149, 23}  |
| n = 25 | {−9, 61, 217, −13}   | {3, 76, 151, 26}  |
| n = 26 | {−8, 52, 224, −12}   | {3, 71, 154, 28}  |
| n = 27 | {−7, 43, 230, −10}   | {2, 67, 156, 31}  |
| n = 28 | {−5, 34, 236, −9}    | {2, 62, 158, 34}  |
| n = 29 | {−4, 25, 242, −7}    | {2, 58, 159, 37}  |
| n = 30 | {−3, 17, 247, −5}    | {2, 54, 160, 40}  |
| n = 31 | {−1, 8, 252, −3}     | {1, 51, 161, 43}  |

TABLE 6

| Sub-pel position n/32 | Gaussian filter {f[0], f[1], f[2], f[3]} |
|---|---|
| n = 1 | {64, 128 64, 0} |
| n = 2 | {61, 116, 67, 12} |
| n = 3 | {59, 115, 69, 13} |
| n = 4 | {57, 115, 71, 13} |
| n = 5 | {55, 114, 73, 14} |
| n = 6 | {53, 113, 75, 15} |
| n = 7 | {50, 112, 76, 16} |
| n = 8 | {47, 111, 80, 18} |
| n = 9 | {45, 110, 82, 19} |
| n = 10 | {43, 109, 84, 20} |
| n = 11 | {41, 108, 86, 21} |
| n = 12 | {40, 106, 88, 22} |
| n = 13 | {37, 105, 90, 24} |
| n = 14 | {36, 106, 92, 25} |
| n = 15 | {34, 101, 94, 27} |
| n = 16 | {32, 100, 96, 28} |
| n = 17 | {30, 98, 98, 30} |
| n = 18 | {28, 96, 100, 32} |
| n = 19 | {27, 94, 101, 34} |

TABLE 6-continued

| Sub-pel position n/32 | Gaussian filter {f[0], f[1], f[2], f[3]} |
|---|---|
| n = 20 | {25, 92, 103, 36} |
| n = 21 | {24, 90, 105, 37} |
| n = 22 | {22, 88, 106, 40} |
| n = 23 | {21, 86, 108, 41} |
| n = 24 | {20, 84, 109, 43} |
| n = 25 | {19, 82, 110, 45} |
| n = 26 | {18, 80, 111, 47} |
| n = 27 | {16, 78, 112, 50} |
| n = 28 | {15, 75, 113, 53} |
| n = 29 | {14, 73, 114, 55} |
| n = 30 | {13, 71, 115, 57} |
| n = 31 | {13, 69, 116, 59} |

Meanwhile, according to another example in this document, when the filter scale is 64 (that is, when 1 is scaled up to 64, such as when the filter coefficients are summed up and divided by 64 to provide 1), the coefficients of the filter may be as shown in the table below.

TABLE 7

| Fractional sample position p | fC interpolation filter coefficients | | | | fG interpolation filter coefficients | | | |
|---|---|---|---|---|---|---|---|---|
| | $f_c[p][0]$ | $f_c[p][1]$ | $f_c[p][2]$ | $f_c[p][3]$ | $fG[p][0]$ | $fG[p][1]$ | $fG[p][2]$ | $fG[p][3]$ |
| 0 | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 15 | 29 | 17 | 3 |
| 3 | −2 | 60 | 7 | −1 | 14 | 29 | 18 | 3 |
| 4 | −2 | 58 | 10 | −2 | 13 | 29 | 18 | 4 |
| 5 | −3 | 57 | 12 | −2 | 13 | 28 | 19 | 4 |
| 6 | −4 | 56 | 14 | −2 | 13 | 28 | 19 | 4 |
| 7 | −4 | 55 | 15 | −2 | 12 | 28 | 20 | 4 |
| 8 | −4 | 54 | 16 | −2 | 11 | 28 | 20 | 5 |
| 9 | −5 | 53 | 18 | −2 | 11 | 27 | 21 | 5 |
| 10 | −6 | 52 | 20 | −2 | 10 | 27 | 22 | 5 |
| 11 | −6 | 49 | 24 | −3 | 9 | 27 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 | −4 | 36 | 36 | −4 | 8 | 24 | 24 | 8 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 27 | 9 |
| 22 | −2 | 20 | 52 | −6 | 5 | 22 | 27 | 10 |
| 23 | −2 | 18 | 53 | −5 | 5 | 21 | 27 | 11 |
| 24 | −2 | 16 | 54 | −4 | 5 | 20 | 28 | 11 |
| 25 | −2 | 15 | 55 | −4 | 4 | 20 | 28 | 12 |
| 26 | −2 | 14 | 56 | −4 | 4 | 19 | 28 | 13 |
| 27 | −2 | 12 | 57 | −3 | 4 | 19 | 28 | 13 |
| 28 | −2 | 10 | 58 | −2 | 4 | 18 | 29 | 13 |
| 29 | −1 | 7 | 60 | −2 | 3 | 18 | 29 | 14 |
| 30 | 0 | 4 | 62 | −2 | 3 | 17 | 29 | 15 |
| 31 | 0 | 2 | 63 | −1 | 3 | 17 | 29 | 15 |

As described above, according to this document, a method for an interpolation filter that interpolates a reference sample under the consideration of the size and the prediction mode of a current block and an intra prediction method using the same are provided. Further, according to the present document, a method and apparatus for effectively deriving a reference sample under the consideration of a distance between a prediction sample and a reference sample are provided.

Figure 19:
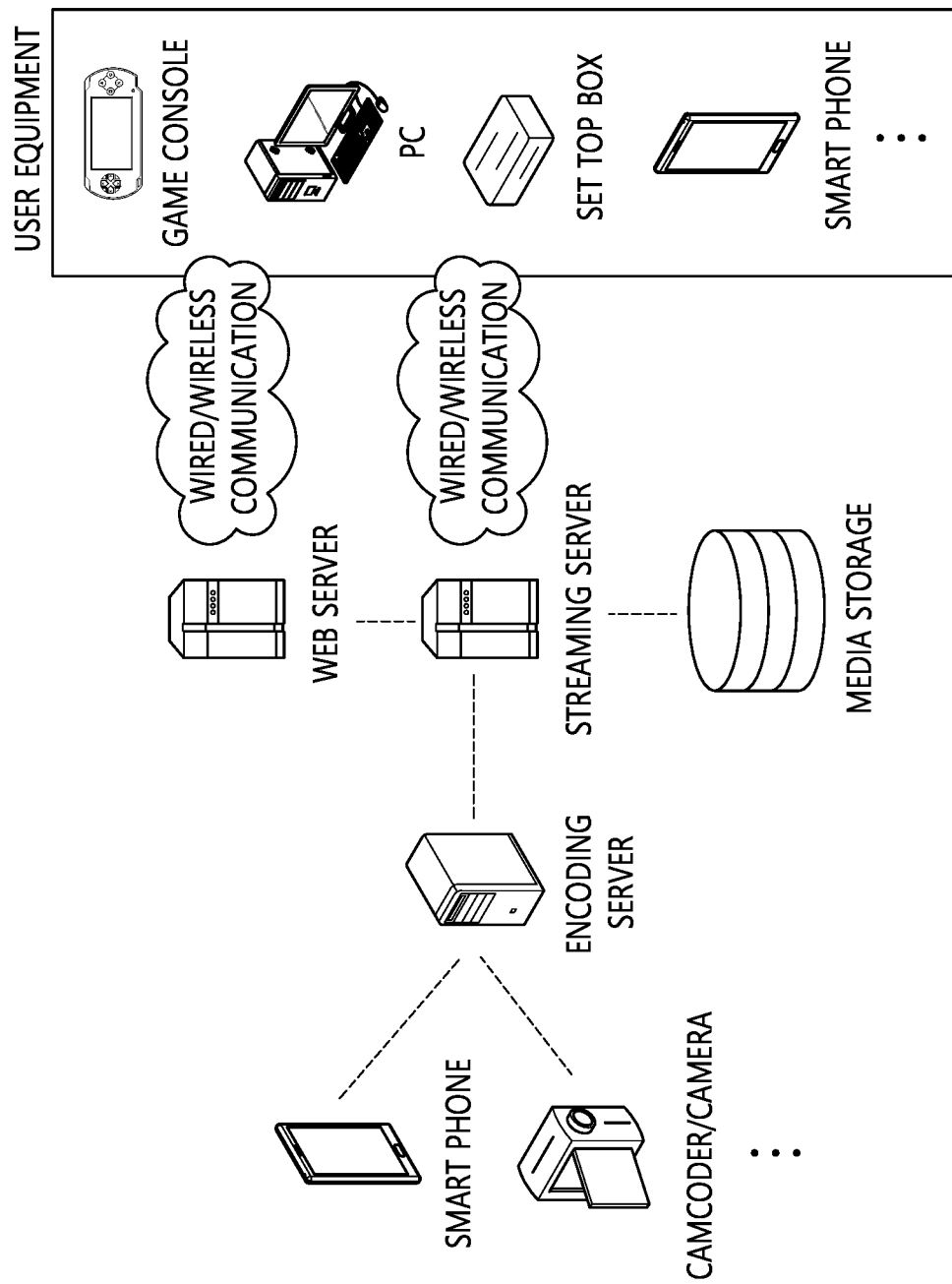
FIG. 19 illustratively represents a content streaming system structure diagram to which the present document may be applied.

FIG. 19 represents an example of a contents streaming system to which the present document may be applied.

Referring to FIG. 19, the content streaming system to which the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. An image decoding method performed by a decoding apparatus, the method comprising:
deriving an intra prediction mode for a current block;
deriving reference samples contiguous to the current block;
generating a prediction sample for the current block based on the intra prediction mode and the reference samples; and
generating a reconstructed picture for the current block based on the prediction sample,
wherein the generating of the prediction sample for the current block includes:
deriving an interpolation filter to be applied to the reference sample based on a prediction mode of the current block or a size of the current block; and
generating the prediction sample by applying the derived interpolation filter to the reference sample,
wherein the deriving of the interpolation filter includes:
comparing a distance between the prediction sample and the reference sample with a predetermined threshold value; and
deriving the interpolation filter as a Gaussian filter based on the distance exceeding the threshold value or as a cubic filter based on the distance being less than or equal to the threshold value,
wherein the distance is derived based on the prediction mode of the current block, and the threshold value is derived based on the size of the current block.

2. The image decoding method of claim 1, wherein the deriving of the interpolation filter includes:
comparing a prediction angle between a direction of the prediction mode of the current block and a vertical direction or a horizontal direction with a preset threshold value; and
deriving the interpolation filter as either a first interpolation filter or the second interpolation filter depending on a comparison result of the prediction angle and the preset threshold value.

3. The image decoding method of claim 2, wherein the preset threshold value is set differently depending on the size of the current block.

4. The image decoding method of claim 2, wherein:
the interpolation filter is derived as the first interpolation filter based on the prediction angle being exceed the threshold value;
the interpolation filter is derived as the second interpolation filter based on the prediction angle being less than or equal to the threshold value; and
the first interpolation filter is a Gaussian filter, and the second interpolation filter is a cubic filter.

5. An image encoding method performed by an encoding apparatus, the method comprising:
deriving an intra prediction mode for a current block;
deriving reference samples contiguous to the current block;
generating a prediction sample for the current block based on the intra prediction mode and the reference samples;
generating residual samples for the current block based on the prediction sample; and
encoding image information including information on the intra prediction mode and the residual sample,
wherein the generating of the prediction sample for the current block includes:
deriving an interpolation filter to be applied to the reference sample based on a prediction mode of the current block or a size of the current block; and
generating the prediction sample by applying the derived interpolation filter to the reference sample,
wherein the deriving of the interpolation filter includes:
comparing a distance between the prediction sample and the reference sample with a predetermined threshold value; and
deriving the interpolation filter as a Gaussian filter based on the distance exceeding the threshold value or as a cubic filter based on the distance being less than or equal to the threshold value, wherein the distance is derived based on the prediction mode of the current block, and the threshold value is derived based on the size of the current block.

6. The image encoding method of claim 5, wherein the deriving of the interpolation filter includes:

comparing a prediction angle between a direction of the prediction mode of the current block and a vertical direction or a horizontal direction with a preset threshold value; and deriving the interpolation filter as either a first interpolation filter or the second interpolation filter depending on a comparison result of the prediction angle and the preset threshold value.

7. The image encoding method of claim 6, wherein the preset threshold value is set differently depending on the size of the current block.

8. The image encoding method of claim 6, wherein:

the interpolation filter is derived as the first interpolation filter based on the prediction angle being exceed the threshold value;

the interpolation filter is derived as the second interpolation filter based on the prediction angle being less than or equal to the threshold value; and the first interpolation filter is a Gaussian filter, and the second interpolation filter is a cubic filter.

9. A non-transitory computer-readable storage medium storing a bitstream generated by a method, the method comprising:

deriving an intra prediction mode for a current block;

deriving reference samples contiguous to the current block;

generating a prediction sample for the current block based on the intra prediction mode and the reference samples;

generating residual samples for the current block based on the prediction sample; and encoding image information including information on the intra prediction mode and the residual sample, wherein the generating of the prediction sample for the current block includes:

deriving an interpolation filter to be applied to the reference sample based on a prediction mode of the current block or a size of the current block; and generating the prediction sample by applying the derived interpolation filter to the reference sample, wherein the deriving of the interpolation filter includes:

comparing a distance between the prediction sample and the reference sample with a predetermined threshold value; and deriving the interpolation filter as a Gaussian filter based on the distance exceeding the threshold value or as a cubic filter based on the distance being less than or equal to the threshold value, wherein the distance is derived based on the prediction mode of the current block, and the threshold value is derived based on the size of the current block.

* * * * *